US011552825B1

(12) United States Patent
Lizewski et al.

(10) Patent No.: US 11,552,825 B1
(45) Date of Patent: Jan. 10, 2023

(54) SYSTEMS AND METHODS FOR CONTROLLING A NON-INTERFERING MODE IN A TELEMATICS DEVICE

(71) Applicant: Geotab Inc., Oakville (CA)

(72) Inventors: Daniel Raymond Lizewski, Kitchener (CA); Siam Ahmed, Burlington (CA); Darren Marc Lohmann Beams, Oakville (CA); Thomas Arthur Walli, Hamilton (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/716,056

(22) Filed: Apr. 8, 2022

Related U.S. Application Data

(60) Provisional application No. 63/305,373, filed on Feb. 1, 2022.

(51) Int. Cl.
| | |
|---|---|
| *H04L 47/20* | (2022.01) |
| *H04L 12/54* | (2022.01) |
| *H04L 12/40* | (2006.01) |
| *H04L 12/70* | (2013.01) |

(52) U.S. Cl.
CPC .... *H04L 12/5601* (2013.01); *H04L 12/40013* (2013.01); *H04L 12/40182* (2013.01); *H04L 2012/5628* (2013.01)

(58) Field of Classification Search
CPC ........... H04L 12/5601; H04L 12/40013; H04L 12/40182; H04L 2012/5628
See application file for complete search history.

(56) References Cited

U.S. PATENT DOCUMENTS

| | | | |
|---|---|---|---|
| 9,984,561 B1 * | 5/2018 | Swafford | G08C 17/02 |
| 11,308,737 B1 | 4/2022 | Smith | |
| 2004/0267410 A1 | 12/2004 | Duri | |
| 2006/0095174 A1 | 5/2006 | Sonnenrein | |
| 2006/0122746 A1 | 6/2006 | Gawlik | |
| 2010/0153207 A1 * | 6/2010 | Roberts | G06Q 10/08 |
| | | | 705/14.63 |
| 2015/0100197 A1 * | 4/2015 | Peirce | H04W 12/08 |
| | | | 701/31.4 |
| 2016/0096508 A1 * | 4/2016 | Oz | H04L 67/125 |
| | | | 701/36 |
| 2016/0099806 A1 * | 4/2016 | Racklyeft | H04W 12/08 |
| | | | 380/281 |
| 2017/0327080 A1 | 11/2017 | Weinfurther | |
| 2018/0124244 A1 * | 5/2018 | Lee | G07C 5/008 |
| 2019/0156592 A1 * | 5/2019 | Miller | G07C 5/008 |
| 2020/0184404 A1 | 6/2020 | Mezaael | |
| 2020/0334989 A1 | 10/2020 | Nahle | |
| 2021/0022068 A1 | 1/2021 | Ayoub | |

(Continued)

FOREIGN PATENT DOCUMENTS

| | | |
|---|---|---|
| CN | 103929830 A | 7/2014 |
| CN | 105094112 B | 5/2018 |
| CN | 109842862 A | 6/2019 |

*Primary Examiner* — Abdelnabi O Musa
(74) *Attorney, Agent, or Firm* — Sherif A. Abdel-Kader

(57) ABSTRACT

Methods and systems for enabling or disabling a non-interfering mode in a telematics device are provided. The methods may include determining by a telematics server that a telematics device coupled to an asset communications bus of an asset may enter or exit a non-interfering mode. The methods may also include detecting the presence of a diagnostic tool on the asset communications bus.

20 Claims, 15 Drawing Sheets

(56) References Cited

U.S. PATENT DOCUMENTS

| | | | |
|---|---|---|---|
| 2021/0225093 A1* | 7/2021 | Hergesheimer | H04W 4/44 |
| 2021/0256782 A1* | 8/2021 | Ehlers | G07C 5/0816 |
| 2021/0266193 A1* | 8/2021 | Bijjala | H04L 12/40013 |
| 2021/0271962 A1 | 9/2021 | Abhishek | |
| 2021/0272392 A1 | 9/2021 | Erdelyi | |

* cited by examiner

1400

Determining by a telematics server that a telematics device coupled to an asset communications bus of an asset must operate in a non-interfering mode
1410

Sending by the telematics server to the telematics device, a command to cause the telematics device to operate in the non-interfering mode
1420

Enabling the non-interfering mode by the telematics device in response to receiving the command from the telematics server
1430

Figure 14

SYSTEMS AND METHODS FOR CONTROLLING A NON-INTERFERING MODE IN A TELEMATICS DEVICE

FIELD

The present disclosure relates generally to vehicle telematics, and more specifically to systems and methods for controlling a non-interfering mode in a telematics device.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method for enabling a non-interfering mode in a telematics device. The method comprises determining by a telematics server that a telematics device coupled to an asset communications bus of an asset must operate in a non-interfering mode, sending by the telematics server to the telematics device a command to cause the telematics device to operate in the non-interfering mode, and enabling the non-interfering mode, by the telematics device in response to receiving the command from the telematics server.

In the non-interfering mode, the telematics device does not interfere with an operation of another device coupled to the asset communications bus.

Determining that the telematics device must operate in the non-interfering mode may comprise receiving a user input from an operator terminal, the user input comprising an indication that the telematics device must operate in the non-interfering mode.

Determining that the telematics device must operate in the non-interfering mode may comprise determining, at the telematics server, that a location of the telematics device is within a zone defining a service center.

The method may further comprise receiving, at the telematics server, from the telematics device, the location of the telematics device.

The non-interfering mode may comprise a listen-only mode in which the telematics device only listens for frames broadcast on the asset communications bus.

The non-interfering mode may comprise a requests-blocked mode in which the telematics device listens for frames broadcast on the asset communications bus and acknowledges frames received at the telematics device to a gateway on the asset communications bus.

The method may further comprise determining, by the telematics device, that the telematics device is to check for a diagnostic tool on the asset communications bus.

The method may further comprise further comprise determining that a diagnostic tool detection sensitivity setting is set to a high setting and in response to detecting a presence of a device with an external identifier on the asset communications bus, enabling the non-interfering mode by the telematics device Detecting the presence of the device with the external identifier may comprise detecting an identifier not associated with any control unit of a plurality of electronic control units of the asset in an identifier field of a frame received on the asset communications bus.

The method may further comprise determining that a diagnostic tool detection sensitivity setting is set to a low sensitivity setting and enabling the non-interfering mode by the telematics device in response to detecting a presence of a specific diagnostic tool on the asset communications bus.

Detecting the presence of the specific diagnostic tool on the asset communications bus may comprise detecting a diagnostic tool identifier in an identifier field of a frame which is broadcast on the asset communications bus.

Detecting the presence of the specific diagnostic tool on the asset communications bus may comprise detecting a pattern associated with the specific diagnostic tool in a payload field of a frame which is broadcast on the asset communications bus.

Detecting the presence of the specific diagnostic tool on the asset communications bus may comprise detecting a diagnostic tool identifier in an identifier field of a frame which is broadcast on the asset communications bus and detecting a pattern associated with the specific diagnostic tool in a payload field of the frame which is broadcast on the asset communications bus.

The method may further comprise determining, by the telematics server, that the telematics device must disable a non-interfering mode, sending by the telematics server, to the telematics device a command to cause the telematics device to disable the non-interfering mode, and disabling the non-interfering mode, by the telematics device in response to receiving the command from the telematics server.

Determining that the telematics device must disable the non-interfering mode may comprise receiving a user input from an operator terminal, the user input comprising an indication that the telematics device must disable the non-interfering mode.

Determining that the telematics device must disable the non-interfering mode comprises determining, at the telematics server, that a location of the telematics device is non in a zone defining a service center.

The method may further comprise determining, by the telematics device, that the telematics device is to check for a presence of a diagnostic tool on the asset communications bus.

The method may further comprise determining that a diagnostic tool detection sensitivity setting is set to a high setting and disabling the non-interfering mode in response to not receiving any frames with an external identifier for a predetermined period of time on the asset communications bus.

The method may further comprise determining that a diagnostic tool detection sensitivity setting is set to a low setting and disabling the non-interfering mode in response to not detecting a specific diagnostic tool for a predetermined period of time on the asset communications bus.

Detecting the specific diagnostic tool may comprise receiving a plurality of frames that do not have either an identifier associated with the specific diagnostic tool in an identifier field of each of the plurality of frames or a pattern associated with the specific diagnostic tool in a payload field of each of the plurality of frames.

In another aspect of the present disclosure, there is provided a method for disabling a non-interfering mode in a telematics device. The method comprises determining by a telematics server that a telematics device coupled to an asset communications bus of an asset must disable a non-interfering mode, sending by the telematics server to the telematics device, a command to cause the telematics device to disable the non-interfering mode, and disabling the non-interfering mode, by the telematics device in response to receiving the command from the telematics server.

In the non-interfering mode, the telematics device may not interfere with an operation of another device coupled to the asset communications bus.

Determining that the telematics device must disable the non-interfering mode may comprise receiving a user input from an operator terminal, the user input comprising an indication that the telematics device must disable the non-interfering mode.

Determining that the telematics device must disable the non-interfering mode may comprise determining, at the telematics server, that a location of the telematics device is not within a zone defining a service center.

The method may further comprise receiving at the telematics server from the telematics device, the location of the telematics device.

The non-interfering mode may comprise a listen-only mode in which the telematics device only listens for frames broadcast on the asset communications bus.

The non-interfering mode may comprise a requests-blocked mode in which the telematics device listens for frames broadcast on the asset communications bus and acknowledges frames received at the telematics device to a gateway on the asset communications bus.

The method may further comprise determining by the telematics device that the telematics device is to check for a presence of a diagnostic tool on the asset communications bus.

The method may further comprise determining that a diagnostic tool detection sensitivity setting is set to a high setting and disabling the non-interfering mode in response to not receiving any frames with an external identifier for a predetermined period of time on the asset communications bus.

The method may further comprise determining that a diagnostic tool detection sensitivity setting is set to a low setting and disabling the non-interfering mode in response to not detecting a specific diagnostic tool for a predetermined period of time on the asset communications bus.

Not detecting the specific diagnostic tool may comprise receiving a plurality of frames that do not have either an identifier associated with the specific diagnostic tool in an identifier field of each of the plurality of frames; or a pattern associated with the specific diagnostic tool in a payload field of each of the plurality of frames.

The method may further comprise disabling by the telematics device the non-interfering mode after an extended period of time has passed.

The method may further comprise the telematics device exiting sleep mode in response to detecting a motion by a motion sensor thereof.

BRIEF DESCRIPTION OF THE DRAWINGS

Exemplary non-limiting embodiments of the present invention are described with reference to the accompanying drawings in which:

FIG. 14 is a flow chart illustrating a method for enabling a non-interfering mode on a telematics device, in accordance with embodiments of the present disclosure.

DETAILED DESCRIPTION

Telematics System

Figure 1:
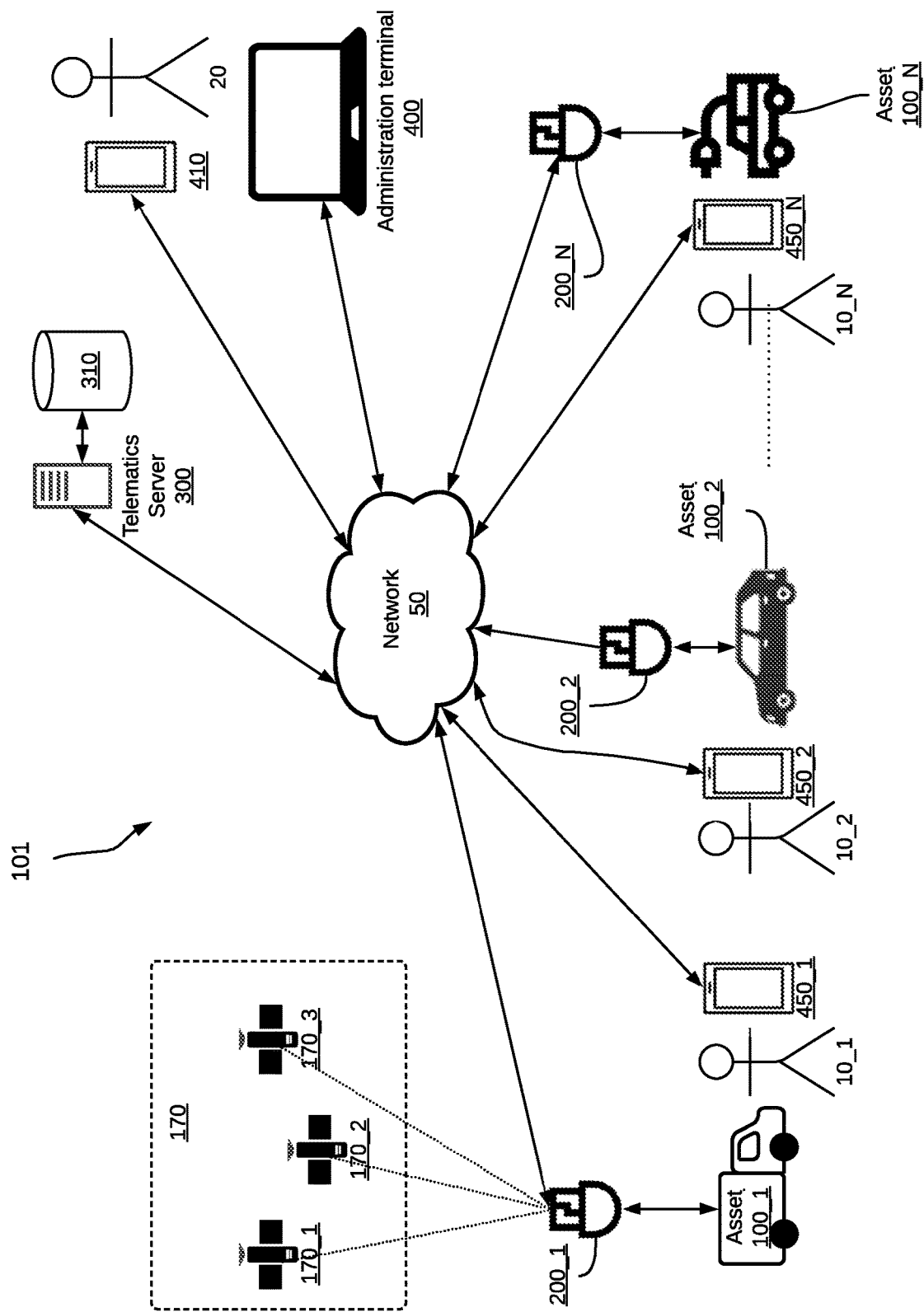
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminals 450"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable programming instructions which enable the telematics server 300 to store and analyze telematics data. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50 and may receive telematics data from the telematics devices 200. The telematics server 300 may have a plurality of software modules for performing data analysis and analytics on the telematics data to obtain useful asset information about the assets 100. The telematics server 300 may be coupled to a telematics database 310 for storing telematics data and/or the results of the analytics which are related to the assets 100. The asset information stored may include operator information about the operators 10 corresponding to the assets. The telematics server 300 may communicate the asset data and/or the operator information pertaining to an asset 100 to one or more of: the administration terminal 400, the handheld administration terminal 410, and the operator terminal 450.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100 or to issue commands to one or more telematics device 200 via the telematics server 300. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface of the telematics server 300. The handheld administration terminal 410 may run a mobile application for communicating with the telematics server 300, the mobile application allowing retrieving data and analytics therefrom. The mobile application of the handheld administration terminal may also be used to issue commands to one or more telematics device 200 via the telematics server 300. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of the assets 100. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is being currently operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data". The telematics device 200 sends the telematics data, to the telematics server 300 over the network 50. The telematics server 300 may process, aggregate, and analyze the telematics data to generate asset information pertaining to the assets 100 or to a fleet of assets. The telematics server 300 may store the telematics data and/or the generated asset information in the telematics database 310. The administration terminal 400 may connect to the telematics server 300, over the network 50, to access the generated asset information. Alternatively, the telematics server 300 may push the generated asset information to the administration terminal 400. Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data may include turning, speeding, and braking information. The telematics server 300 can correlate the telematics data to the vehicle's driver by querying the asset database 310. A fleet manager 20 may use the administration terminal 400 to set alerts for certain activities pertaining to the assets 100. When criteria for an alert is met, the telematics server 300 sends a message to the fleet manager's administration terminal 400, and may optionally send alerts to the operator terminal 450 to notify an operator 10 of the alert. For example, a vehicle driver operating the vehicle outside of a service area or hours of service may receive an alert on their operator terminal 450. A fleet manager 20 may also the administration terminal 400 to configure a telematics device 200 by issuing commands thereto via the telematics server 300.

Telematics Device

Figure 2:
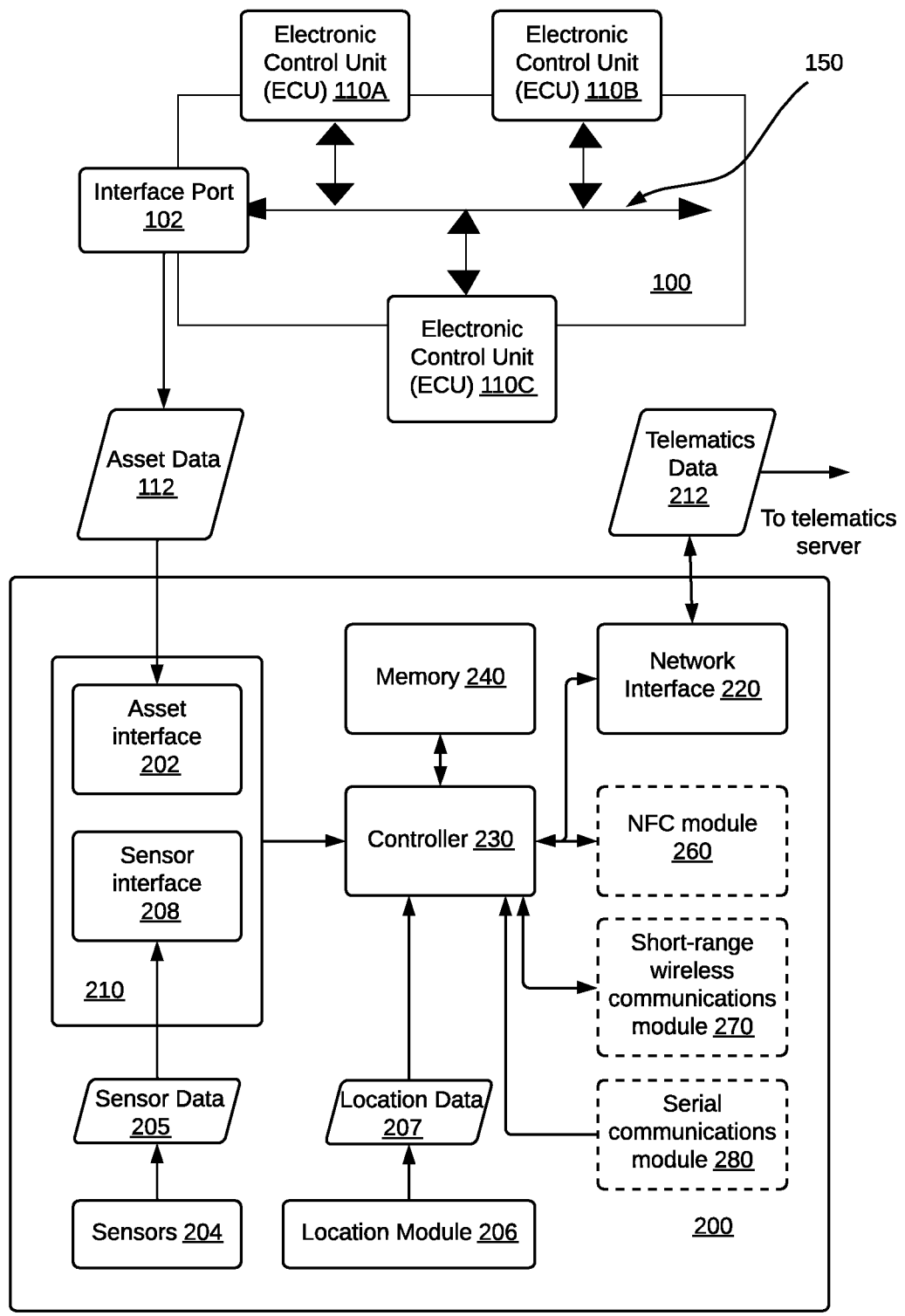
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. For example, an oil temperature ECU may contain a temperature sensor and a controller for converting the measured temperature into digital data representative of the oil temperature. Similarly, a battery voltage ECU may contain a voltage sensor for measuring the voltage at the positive battery terminal and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three electronic control units: ECU 110A, ECU 110B, and ECU 110C ("ECUs 110"). The ECU 110A, the ECU 110B, and the ECU 110C are shown to be interconnected via an asset communications bus, such as a Controller Area Network (CAN) bus 150. ECUs 110 interconnected using the CAN bus 150 send and receive information to one another in CAN data frames by placing the information on the CAN bus 150. When an ECU places information on the CAN bus 150, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol to exchange information over a CAN bus 150. Most passenger vehicles use the SAE J1979 protocol, which is commonly known as On-Board Diagnostic (OBD) protocol to exchange information between ECUs 110 on their CAN bus 150. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to carry out the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 300 over a network 50. In some embodiments, the memory 240 only stores data, and the machine-executable programming instructions for carrying out the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is travelling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 300.

The short-range wireless communications module 270 is a component intended for providing short-range wireless communication capability to the telematics device 200. The short-range wireless communications module 270 may be a Bluetooth™, wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit ($I^2C$) bus. As another example, the serial communications module 280 may be a universal serial bus (USB) transceiver.

In operation, an ECU 110, such as the ECU 110A, the ECU 110B, or the ECU 110C communicates asset data over the CAN bus 150. The asset data exchanged, between the ECUs 110, over the CAN bus 150 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 300 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 300. The received commands instruct the telematics device 200 to be configured in a particular way. For example, the received commands may configure the way in which the telematics device gathers asset data 112 from the asset 100 as will be described in further detail below.

The telematics data 212 which is comprised of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 3:
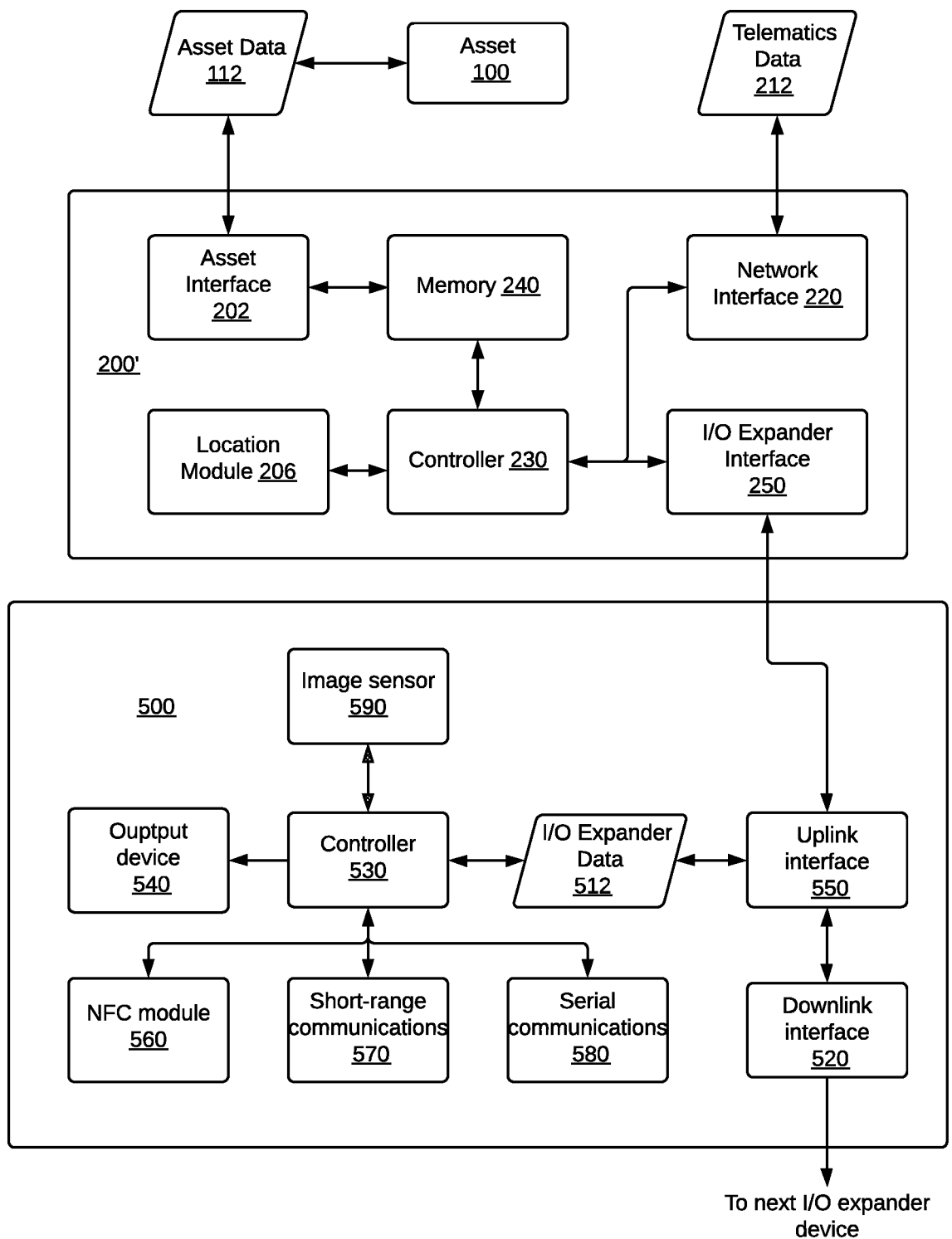
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 200' coupled to an asset 100. An I/O expander 500 is coupled to the telematics device 200'.

The asset 100 is similar to the asset 100 of FIG. 2 and therefore the internal components thereof are not shown in FIG. 3 for simplicity.

The telematics device 200' has a somewhat similar configuration as the telematics device 200 of FIG. 2, but some of the optional components have been removed. Furthermore, the telematics device 200' adds an I/O expander interface 250 for interfacing with the I/O expander 500. The I/O expander interface 250 is coupled to the controller 230 and may be configured for exchanging I/O expander data 512 with the I/O expander 500.

The I/O expander 500 of FIG. 3 is an example I/O expander which is designed to provide additional connectivity options to a telematics device 200, which has more limited features than the one shown in FIG. 2. For example, the telematics device 200' shown in FIG. 3 does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 3 shows an I/O expander 500 containing several components which may or may not all be present in other I/O expanders. For example, the I/O expander 500 includes a controller 530, an NFC module 260, an output device 540, a short-range communications module 570, an image sensor 590, a serial communications module 580, an uplink interface 550 and a downlink interface 520.

The controller 530 may be similar to the controller 230 of FIG. 3. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2.

The image sensor 590 may be a digital still camera or a digital video camera capable of capturing images. For example, the image sensor 590 may be a road-facing dashboard camera for monitoring the road ahead. In other examples, the image sensor 590 may be a driver-facing dashboard camera for identifying the operator 10 and/or their condition.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500.

Integrated Telematics Device

Figure 4:
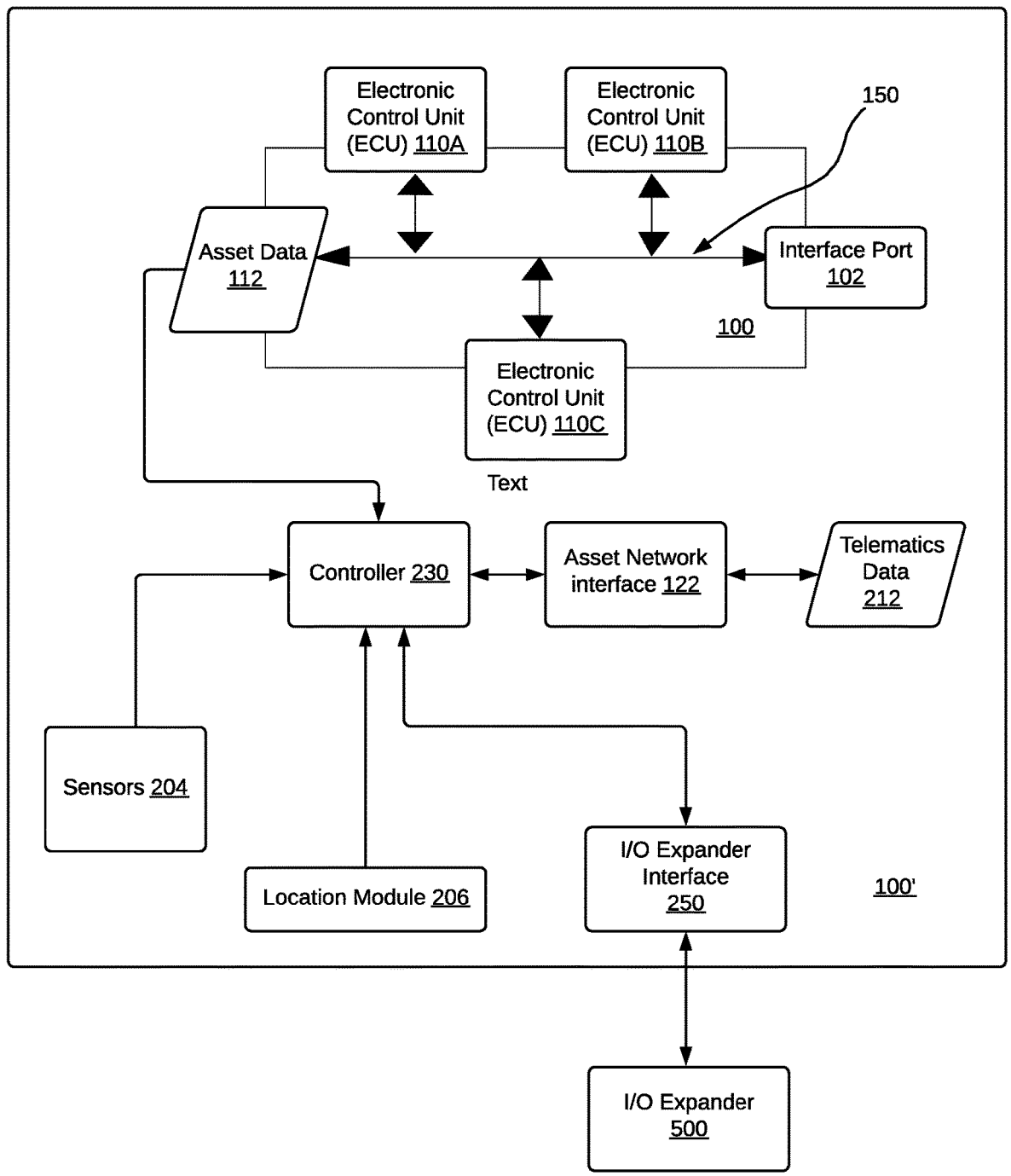
FIG. 4 is a block diagram showing an asset having a telematics device integrated therein and I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 100' with the components of a telematics device integrated therein, in accordance with embodiments of the present disclosure. The asset 100' is similar to the asset 100 but, being a connected asset such as a connected car, it has an asset network interface 122. In the depicted embodiment, the controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the controller 230 as described above. The asset network interface 122 belongs to the asset 100' and may be used by the asset 100 to communicate with an original equipment manufacturer (OEM) server, to a roadside assistance server, or for other purposes. The controller 230 may utilize the asset network interface 122 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Diagnostic Equipment

Figure 5:
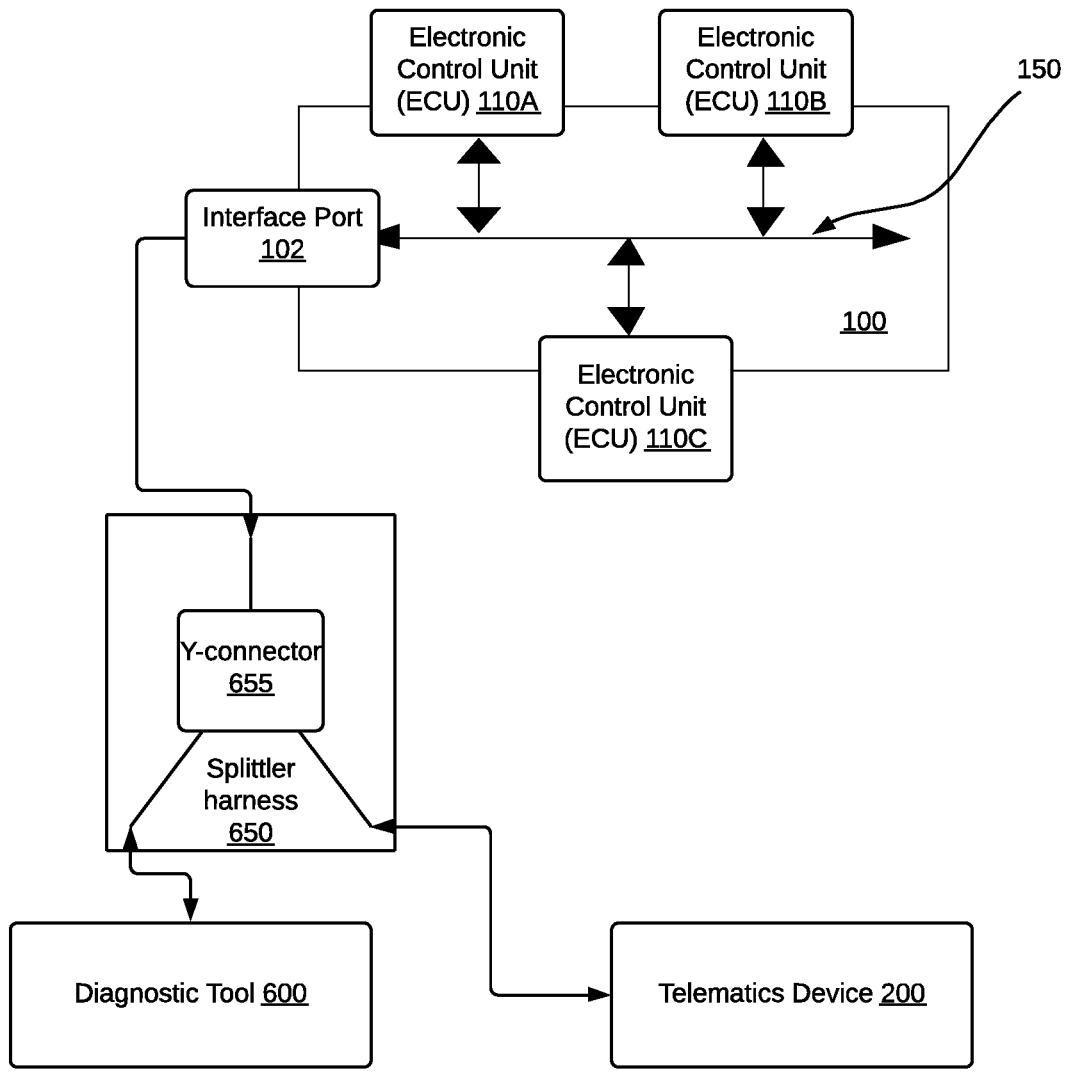
FIG. 5 is a block diagram showing a telematics device and a diagnostic tool both connected to a communications bus of an asset via a splitter connector.

As briefly mentioned above, a vehicle asset may be connected to a diagnostic tool 600, such as an OBD-II reader, in addition to having a telematics device 200 connected therewith. FIG. 5 depicts an asset 100 connected to both a telematics device 200 and a diagnostic tool 600 via a splitter connector 650.

The asset 100 may be a vehicle asset similar to the asset 100 of FIG. 2. As discussed above, the asset 100 may have an interface port 102 which gives access to the CAN bus 150 thereof.

The telematics device 200 may be a telematics device similar to the telematics device 200 of FIG. 2 or the telematics device 200' of FIG. 3.

In this disclosure a "diagnostic tool" is an electronic device that may be used to read asset data 112 for the purpose of diagnosing problems or conducting performance testing such as emission testing. A diagnostic tool may also clear some engine error codes. A diagnostic tool may also be referred to as a "scan tool" or a "testing tool". In the depicted embodiment of FIG. 6, the diagnostic tool 600 may be an OBD-II reader or any other diagnostic tool for use with a vehicle asset. For example, the diagnostic tool 600 may read asset data 112 for the purpose of performing an emissions test, or to check error codes generated by the vehicle asset's ECUs in response to the "check engine" indicator being turned on in the vehicle asset's dashboard. The diagnostic tool 600 may be a stationary diagnostic tool installed in a workshop, or a portable diagnostic tool. The diagnostic tool 600 may send request frames to at least some of the ECUs 110 of the asset 100 requesting certain information. For example, for an asset having a CAN bus 150, the diagnostic tool 600 sends CAN data frames containing request commands that cause one or more of the ECUs 110 to respond with information that is used by the diagnostic tool 600 to report errors or diagnose problems. Additionally, the diagnostic tool may send CAN data frames containing commands that may resets one or more error conditions on one or more ECUs 110.

In this disclosure, a "splitter connector" refers to a device, cable, or harness that splits an electrical connection into two thus allowing two electrical devices to connect to the same interface. A splitter connector may include a Y-connector or a T-connector. The splitter connector 650 depicted in FIG. 5 comprises a Y-connector 655 for splitting a connection from the vehicle's interface port 102 into two connections so that both the telematics device 200 and the diagnostic tool 600 may have access to the interface port 102 and the CAN bus 150. For example, if the telematics device 200 is not to be removed from the vehicle at any time or the vehicle may be in violation of some regulations, then in order to also perform some diagnostics or emission tests, the telematics device 200 is connected to one of the two connections provided by the splitter connector 650. As a result, the diagnostic tool 600 may be connected to the other one of the two connections provided by the splitter connector 650. In some cases, a splitter connector may be referred to as a "splitter harness".

Figure 6:
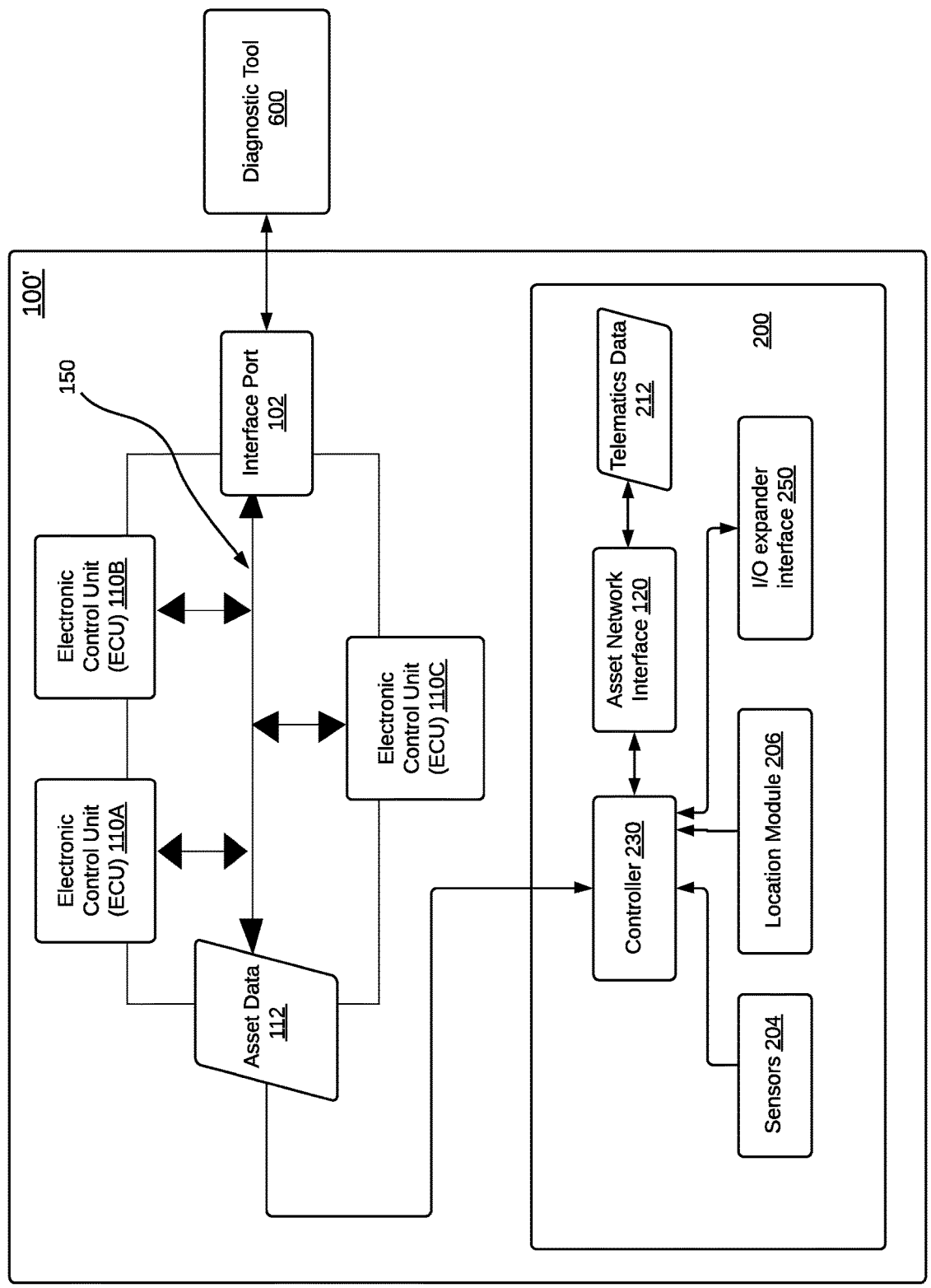
FIG. 6 is a block diagram showing the asset of FIG. 4, which has an integrated telematics device having a diagnostic tool connected to the communications bus thereof.

With reference to FIG. 6, there is shown an asset 100' having a telematics device integrated therein as discussed above with reference to FIG. 4. In this embodiment, a diagnostic tool 600 may be connected directly to the interface port 102 and gain access to the asset communications bus, such as the CAN bus 150. As such, both the telematics device, which is integrated into the asset 100', and the diagnostic tool 600 may communicate with the ECUs 110 of the asset 100'.

In the embodiments of both FIG. 5 and FIG. 6, there is a concern regarding a conflict between the telematics device 200 and the diagnostic tool 600 as they both communicate with the ECUs 110 of the asset 100 or the asset 110' on the asset communications bus, such as the CAN bus 150. The conflict may be a result of the way both the telematics device 200 and the diagnostic tool 600 interact with the assets 100 or 100', coincidental similarities in the format of the frames exchanged, or other reasons. The telematics device 200 may obtain asset data 112 from the asset 100 or the asset 100' in a number of ways. In some instances, the telematics device 200 listens to data frames broadcast or sent over the vehicle communications bus, such as the CAN bus 150. The data frames may contain the asset data 112 that the telematics device 200 may use to infer the status of the asset. In other instances, the telematics device 200 requests the asset data 112 of interest thereto from the asset. Requesting the asset data 112 includes the telematics device 200 sending request frames to one or more ECU 110 in the asset. Upon receiving the request command frames, the one or more ECU 110 responds with the requested data by placing the requested asset data 112 on the vehicle communications bus, such as the CAN bus 150.

Figure 7:
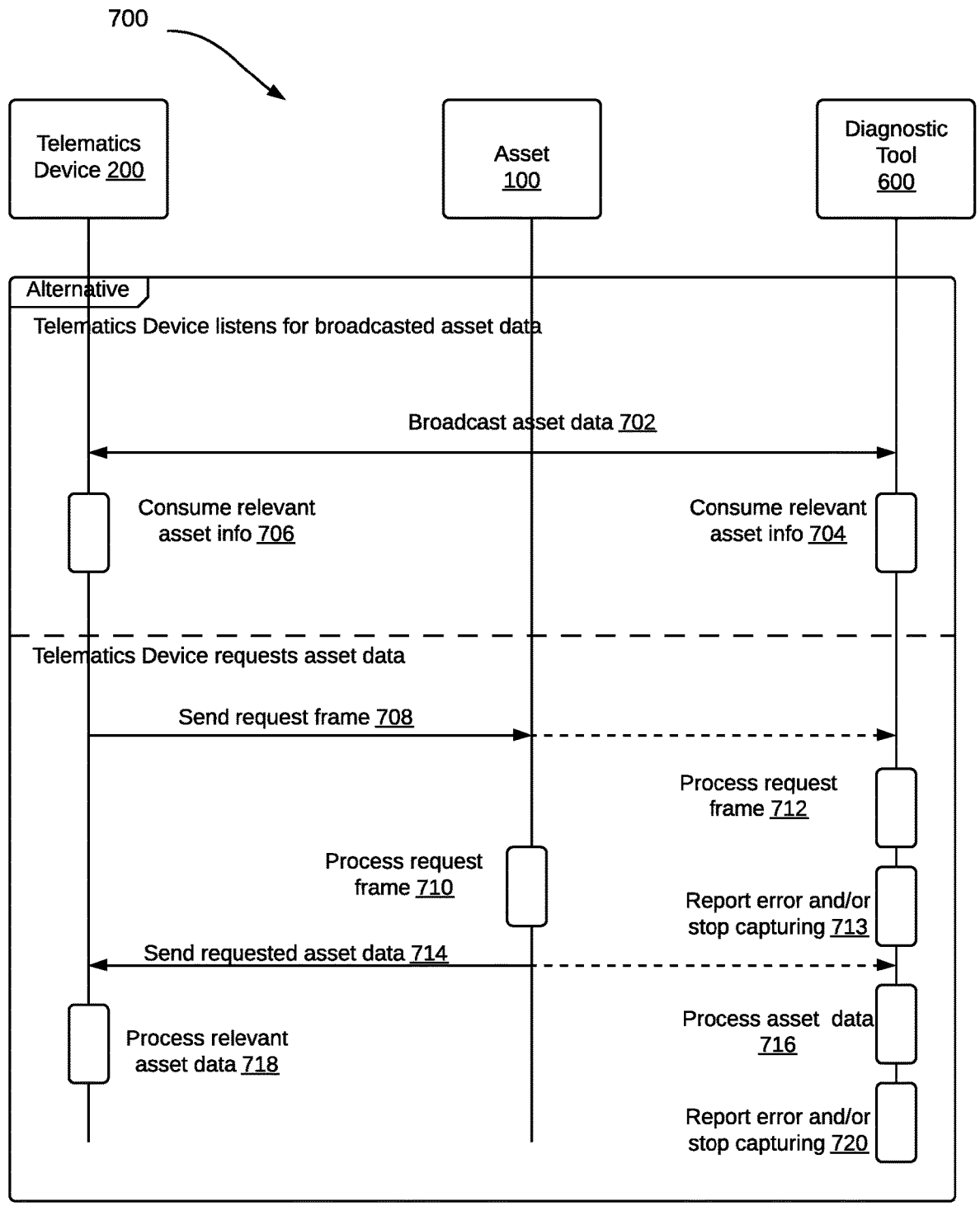
FIG. 7 is a message sequence diagram illustrating potential problems with diagnostic tool operation due to request messages sent by a telematics device connected to the same bus.

FIG. 7 is a message sequence diagram 700 illustrating the different ways that the telematics device 200 captures asset information from the asset 100, which may be a vehicle asset. It should be understood from FIG. 7 that the asset 100 represents a plurality of ECUs 110 that may broadcast asset data or send asset data in response to requests. The first way that an asset 100 may provide asset data 112 is depicted as the first alternative of the sequence diagram. The first way involves the telematics device 200 listening for broadcasted asset data 112 from the asset 100. At step 702, the asset 100 broadcasts the asset data 112 on the communications bus, such as the CAN bus 150. Both the telematics device 200 and the diagnostic tool 600, which are connected to the CAN bus 150, may receive and consume the asset data 112. For example, at step 704, the diagnostic tool 600 consumes a first portion of the asset data 112 that is relevant to the function of the diagnostic tool 600. Similarly, at step 706, the telematics device 200 consumes a second portion of the asset information 112 that is relevant to the function of the telematics device 200. The first and second portions of the asset data 112 that are processed by the telematics device 200 and the diagnostic tool 600 may be the same or different. For example, the telematics device 200 may focus on processing real-time engine data and ignore other portions of the asset data 112. Conversely, the diagnostic tool 600 may only process engine error codes and parameters related to emissions testing such as evaporation system and oxygen sensor data. In the first alternative of the message sequence diagram 700, where the telematics device 200 listens for broadcasted asset data, it is unlikely that a conflict arises between the telematics device 200 and the diagnostic tool 600 when they are both listening for data frames placed on the CAN bus 150 by the ECUs 110 of the asset 100.

The second way that the telematics device 200 may obtain the asset data 112 from the asset 100 is by directly requesting some specific data via a request command sent in a request frame over the asset communications bus, such as the CAN bus 150. This way is depicted as the second alternative of the message sequence diagram 700 in which the telematics device 200 requests asset data by sending a request frame to the asset 100. At step 708, the telematics device 200 sends a request frame to the asset 100. For example, the telematics device 200 may send a CAN data frame on the CAN bus 150, wherein the CAN data frame contains a command which requests specific data from one or more ECUs 110 of the asset 100. Due to the nature of the CAN bus 150 where frames are placed on the bus and are accessible by any ECU 110 or another device connected to the CAN bus 150, the CAN data frame sent by the telematics device 200 may also be read by the diagnostic tool 600. In some instances, the diagnostic tool 600 may ignore the CAN data frame sent by the telematics device 200 as a frame containing a payload that the diagnostic tool 600 is not interested in. However, in other instances, the diagnostic tool 600 may assume that the CAN data frame sent by the telematics device 200 was sent by an ECU 110 of the asset 100 and may process it at step 712, which is undesirable. Processing the CAN data frame, which was sent by the telematics device 200, requesting asset data 112, by the diagnostic tool 600 is undesirable because it may lead the diagnostic tool 600 to deduce that the asset 100 is not functioning properly or is incompatible with the diagnostic tool 600. In some cases, as shown in step 713, the diagnostic tool 600 may issues an error message and/or refrain from capturing further frames containing asset data from the asset communications bus, such as the CAN bus 150. As a result, the diagnostic tool 600 may fail to report engine error codes or complete an emissions test.

In response to receiving the request frame sent at step 708, at least some of the ECUs 110 of the asset 100 may process the request frame pertaining thereto, at step 710. In response to processing the information request frame, at step 714 the ECU(s) 110 which have processed the request frame may send a portion of asset data 112 pertaining to the request frame to the telematics device 200. At step 718, the telematics device 200 processes the portion of asset data 112 provided by the asset 100 in step 714. Since the CAN bus 150 is a shared bus to which the diagnostic tool 600 is connected, the diagnostic tool 600 may also receive the portion of asset data 112 requested by the telematics device 200 at step 714. As a result, at step 716 the diagnostic tool 600 may also process the portion of the asset data 112 provided by the asset 100. As a result of processing the portion of the asset data 112 that the diagnostic tool 600 did not request, the diagnostic tool 600 may report an error or stop capturing asset data from the asset 100 as shown in step 720.

To address the conflict arising from the telematics device 200 posting request frames on the communications bus of the asset 100, the present disclosure proposes what is termed a non-interfering mode for the telematics device 200. The non-interfering mode is a mode in which the telematics device 200 does not interfere or at least significantly minimizes the possibility of interfering with a diagnostic tool 600 connected to the same asset communications bus. In this disclosure, the "non-interfering mode" of the telematics device 200 may be one of two modes: a "listen-only" mode, and a "requests-blocked" mode.

In a listen-only mode, the telematics device 200 configures the asset interface 202 thereof to only listen for frames on the CAN bus 150, totally refrains from sending any frames thereon, and does not acknowledge receipt of any frame on the CAN bus 150. On a vehicle asset that does not have a gateway between the CAN bus 150 and the interface port 102, a listen-only mode is an appropriate non-interfering mode. Since the telematics device 200 is directly connected to the CAN bus 150, even if the telematics device 200 does not acknowledge receipt of a CAN data frame containing a portion of asset data 112, other ECUs 110 on the CAN bus 150 will acknowledge receipt of the portion of asset data 112. Accordingly, the ECU 110 which has placed that portion of asset data 112 on the CAN bus 150 may continue to place similar portions of asset data 112 on the CAN bus 150. As discussed earlier, any data placed on the CAN bus 150 is available to all ECUs 110. An ECU 110 may acknowledge receipt of the data even if that ECU 110 does not consume the data placed on the CAN bus 150. For example, when one ECU 110 places data on a CAN bus 150 other ECUs pull an acknowledgement (ACK) bit low on the bus indicating that the data has been consumed. The ECU which placed the data on the CAN bus 150 does not know which other ECU (or telematics device) has consumed the data.

Figure 8:
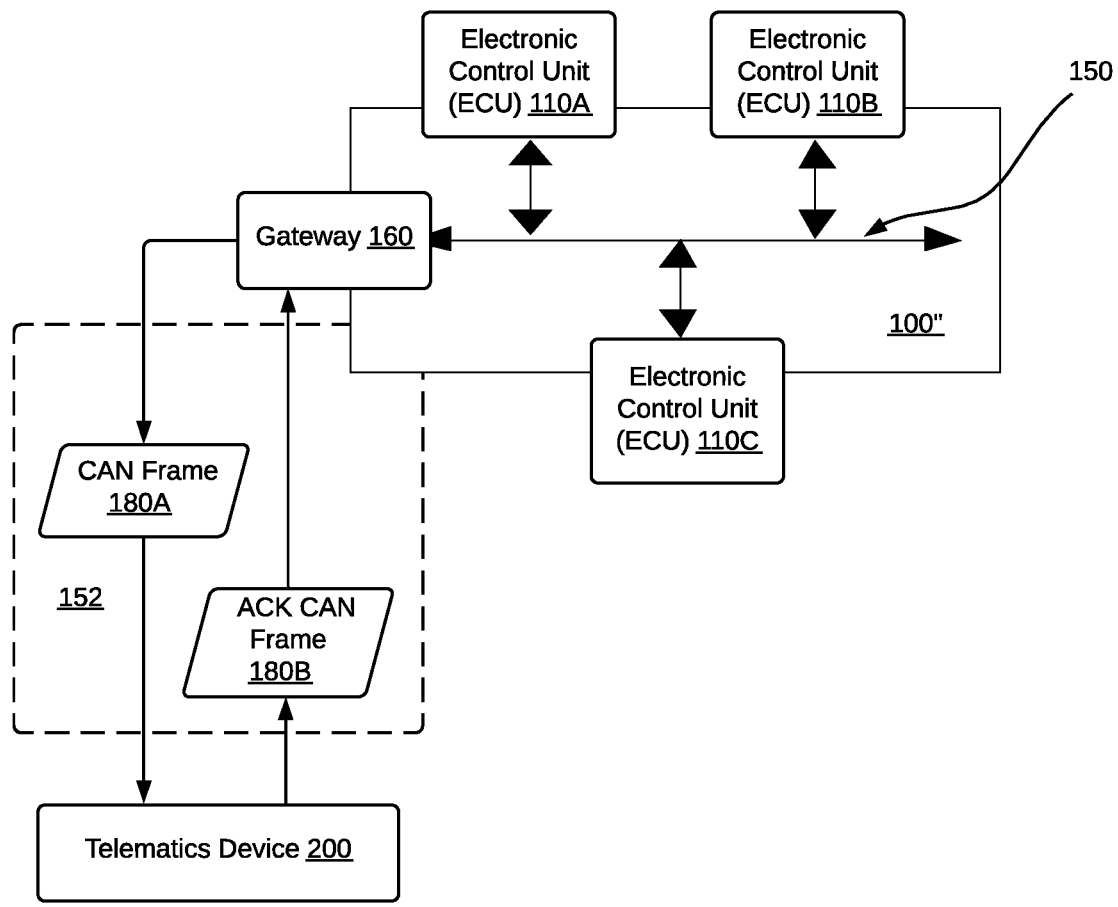
FIG. 8 is a block diagram showing an asset having a gateway and a telematics device coupled thereto via the gateway, in accordance with embodiments of the present disclosure.

In some assets, there is a gateway placed between the asset communications bus and external devices. The gateway controls the asset data 112 available to the external devices. In some instances, the gateway requires an explicit acknowledgement of the asset data from the external devices connected to the asset communications bus via the gateway. In the event that the gateway makes some data available to external devices but does not receive an acknowledgement of that the data has been consumed by the external devices, the gateway may refrain from making portions of asset data 112 available to external devices going forward. In this case, the listen-only mode for the telematics device 200 is not an appropriate non-interfering mode. The telematics device 200 uses a requests-blocked mode as the non-interfering mode. To illustrate, FIG. 8 illustrates an asset 100" incorporating a gateway 160 providing access to the CAN bus 150. The telematics device 200 is connected to the asset 100" via the gateway 160. It may be said that the telematics device 200 is connected on an external CAN bus 152 of the asset 100". In the illustrated embodiment, the interface port 102 is incorporated into the gateway 160 and is not shown as a separate component for simplicity. The gateway 160 may place a CAN data frame 180A on the external CAN bus 152 so it may be read by the telematics device 200. The gateway 160 expects to receive an acknowledged (ACK) CAN data frame 180B in response to placing the CAN data frame 180A on the external CAN bus 152. If the telematics device 200 does not acknowledge the CAN data frame 180A, then the gateway 160 may assume that no external devices are connected to the external CAN bus 152 and may refrain from placing further CAN data frames thereon. Accordingly, the telematics device 200 uses a requests-blocked mode as its non-interfering mode when connected to vehicles incorporating a gateway 160. In the requests-blocked mode, the telematics device 200 does not explicitly send any requests to the asset 100", but acknowledges any CAN data frames containing asset data when it receives same from the asset 100" via the gateway 160.

A telematics device may enter a non-interfering mode such as a listen-only mode or a requests-blocked mode based on a number of factors. In some embodiments, the telematics device 200 may receive a command from the telematics server 300 indicating that the asset 100 to which the telematics device 200 is coupled is in a workshop and thus may be undergoing diagnostics or maintenance. In this disclosure "workshop mode" refers to the asset 100 coupled to a telematics device 200 being in a service center or a workshop. In response to receiving the command to enter workshop mode, the telematics device 200 enables a non-interfering mode. In some embodiments, the telematics device enters a non-interfering mode based on detecting the connection of a diagnostic tool 600 thereto. This will be described in more detail below.

The command, sent by the telematics server 300 to the telematics device 200 causing it to enable workshop mode may be sent based on a number of factors. These factors include receiving an indication from the operator 10 indicating that the asset 100 is in a workshop, determining at the telematics server 300 that the asset 100 is geographically located at a workshop, and receiving a command from an administration terminal 400 (operated by a fleet manager 20, for example) instructing the telematics server 300 to enable the workshop mode on the telematics device 200 for a specified asset 100.

In some embodiments, an operator 10 may, using an operator terminal 450, provide some input indicating that a vehicle asset is in a workshop. The user input indicating that the vehicle is in a workshop is sent to the telematics server 300. In response to receiving the user input, the telematics server 300 may send a workshop enable command to the telematics device 200.

In some embodiments, the telematics device 200 may report its location, as part of the telematics data, to the telematics server 300. The telematics server 300 may determine, based on geofencing rules, that the telematics device 200 is located inside a zone corresponding to a workshop, garage, or maintenance facility. The telematics server 300 first sends a message to an administration terminal 400 indicating that the asset 100 coupled to the telematics device 200 is in a workshop. In response, a fleet manager 20 may send a command, via the administration terminal 400, to the telematics server 300 instructing the telematics server 300 to send a workshop enable command to the telematics device 200.

Figure 9:
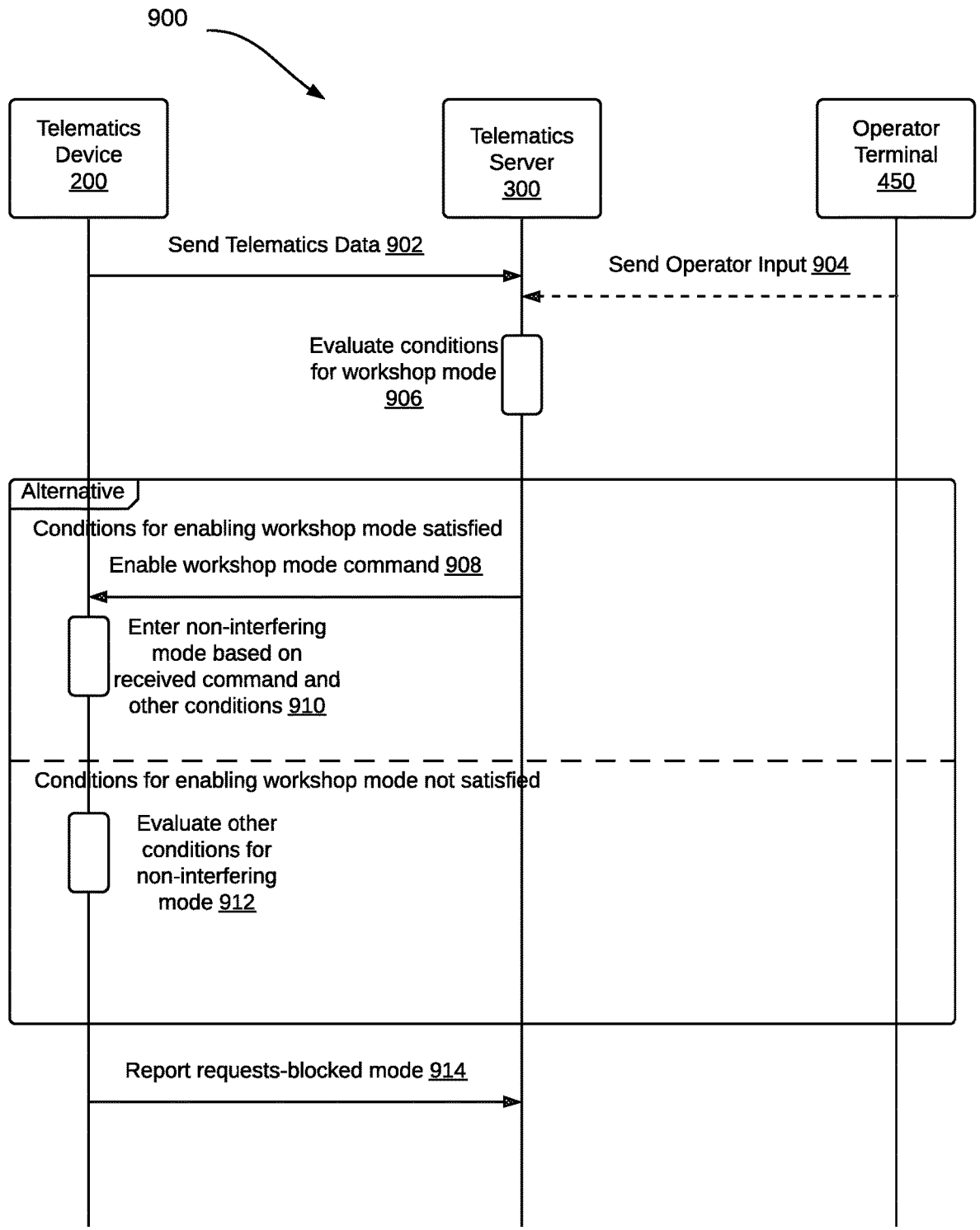
FIG. 9 is a message sequence diagram illustrating enabling workshop mode on a telematics device, in accordance with embodiments of the present disclosure.

FIG. 9 depicts a message sequence diagram 900 illustrating an exemplary method of switching a telematics device 200 into a non-interfering mode, in accordance with embodiments of the present disclosure. At step 902, the telematics device 200 sends telematics data 212 to the telematics server 300. The telematics data 212 may include location data 207 and asset data 112 gathered from the asset 100.

In some embodiments, in addition to the telematics data 212 received at step 902, the telematics server 300 may receive additional input from the asset's operator 10, as discussed above. For example, at step 904, the operator 10 of the asset 100 may provide input via the operator terminal 450, and such operator input may be sent to the telematics server 300. The operator input may comprise an indication that the asset 100 is in the workshop for the purpose of diagnosing a problem, performing an emissions test, or for carrying out any type of maintenance. It should be noted that the operator, via the operator terminal 450, has to identify the particular asset 100 they are operating.

At step 906, the telematics server 300 evaluates conditions for enabling workshop mode based on the telematics data 212 received at step 902 and/or the operator input.

In some embodiments, the telematics server 300 may have prior knowledge of the locations of a number of service centers. The telematics server 300 may compare the location data 207 reported by the telematics device 200 as part of the telematics data 212 with the locations of service centers. For example, zones or geofences may be defined around a number of service centers and the telematics server 300 may determine whether the asset 100, which may be a vehicle, has entered, is present at, or has exited a service center. The telematics server 300 may decide, based on the presence of the asset 100 in the zone defining the service center that it needs to enable workshop mode for telematics device corresponding to the asset 100 in order to avoid potential conflict with a diagnostic tool 600 while the asset 100 is at the service center location. To identify the telematics device 200 corresponding to an asset 100, the telematics server 300 may query the telematics database 310 coupled thereto.

In some embodiments, the telematics server 300 may determine that workshop mode for the telematics device 200 needs to be enabled based on the operator input provided by the operator 10 at the operator terminal 450, which may include an indication that the asset 100 is in a workshop.

In some embodiments, one or the other of the aforementioned conditions is prioritized over the other or both of them may need to be satisfied so that the telematics server 300 determines that workshop mode needs to be enabled.

In one embodiment, the telematics server 300 may determine that workshop mode is to be enabled when both the asset 100 is within the boundary of the zone around a service center and the operator provides input indicating that the vehicle is undergoing a service that requires the connection of a diagnostic tool.

In another embodiment, the telematics server 300 may determine that workshop mode is to be enabled solely based on the location data 207 indicating that the asset 100 is in a workshop.

In yet another embodiment, the telematics server 300 may determine that the workshop mode is to be enabled solely based on the operator input provided at the operator terminal 450.

In a further embodiment (not shown), the telematics server 300 may determine that the workshop mode is to be enabled based on receiving a command from an administration terminal 400 to enable the workshop mode.

After step 906 is executed, either step 910 or step 912 is executed depending on the outcome of the evaluation done at step 906. If, at step 906, the telematics server 300 determines that the conditions for enabling workshop mode are satisfied then step 908 and step 910 are executed. If, at step 906, the telematics server 300 determines that the conditions for enabling workshop mode are not satisfied, then step 912 is executed.

At step 908, the telematics server 300 sends a message (or command) to the telematics device 200 indicating that workshop mode is to be enabled. In some embodiments (not shown), the telematics device 200 may send back a message to the telematics server 300 acknowledging receipt of the message to enable the workshop mode.

At step 910, the telematics device 200 may enter a non-interfering mode in response to receiving the command to enable workshop mode and/or on other conditions. In some embodiments, the telematics device 200 may be configured to enter the non-interfering mode based solely on the enable workshop mode command received in step 908. In other embodiments, the telematics device 200 may still perform diagnostic tool detection before entering the non-interfering mode. This will be described in further detail below.

At step 912, the telematics device 200 evaluates other conditions for entering the requests-blocked mode, as will be described below.

At step 914, the telematics device 200 may optionally report back to the telematics server 300 on the status of the operating mode thereof, i.e., whether the non-interfering mode is enabled or disabled.

In some embodiments, the method described with reference to FIG. 9 may be modified such that the operator terminal 450 communicates directly with the telematics device 200 over a short-range communications link such as a Bluetooth link. In such embodiment, the operator input provided in step 904 may comprise a command to enable workshop mode and may be sent directly to the telematics device 200 over the short-range communications link. In such embodiments, the telematics server 300 evaluates, at step 906, whether the telematics device 200 is located in a service center only. In some embodiments, the telematics device 200 may prioritize an enable workshop mode command received directly from the operator terminal 450 and enter the non-interfering mode in response to the enable workshop mode command regardless of the enable workshop command received at step 908 from the telematics server 300.

In some embodiments, the method described with reference to FIG. 9 may also be modified such that instead of the operator terminal 450, it is the administration terminal 400 or the handheld administration terminal 410 that provides input to the telematics server 300 requesting that workshop mode be enabled for a particular asset 100. For example, the operator 10 may use the operator terminal 450 to request permission to halt normal operation of the asset 100 and submit the asset for testing or diagnostics. The request for permission may be sent to the telematics server 300 and forwarded to the administration terminal 400 or to the handheld administration terminal 410. In response, the fleet manager 20 may approve the testing or diagnostics for the asset 100 by responding, using the administration terminal 400, to the telematics server 300 with a response authorizing the testing or diagnostics. The response approving the testing or diagnostics for the asset 100 may also cause the telematics server 300 to send a command to enable workshop mode, as described above with reference to step 908.

As discussed above with reference to FIG. 9, the telematics device 200 at step 912 evaluates other conditions for enabling a non-interfering mode when no workshop enable command is received from the telematics server. The telematics device 200 attempts to determine whether a diagnostic tool 600 is connected to the CAN bus 150 of the asset 100 to which it is coupled. Determining whether a diagnostic tool is connected to the CAN bus 150 comprises examining CAN data frames exchanged on the CAN bus 150. As such, it is helpful to examine the format of a CAN data frame, which is done with reference to FIG. 10. While FIG. 10 depicts a simplified depiction of a CAN data frame 1000, it would be apparent to those of skill in the art that the methods for detecting a diagnostic tool described in this disclosure may work with other types of messages.

Figure 10:
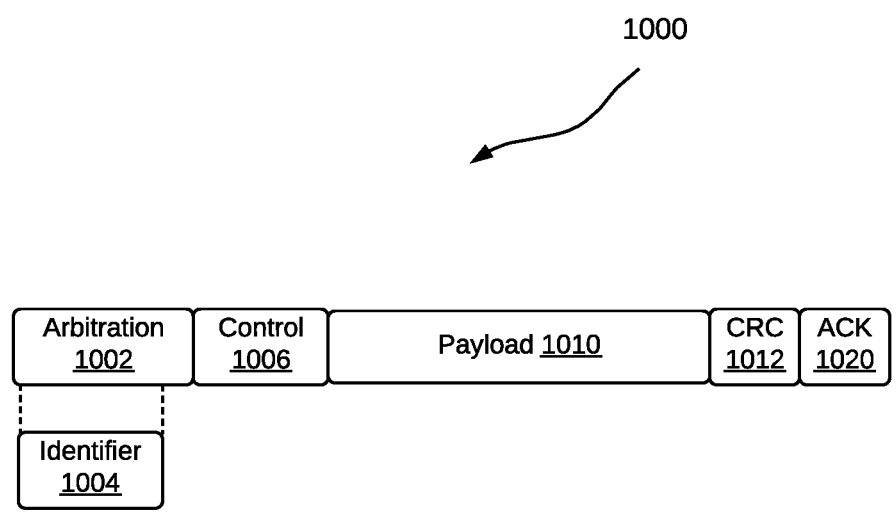
FIG. 10 is a simplified representation of a CAN data frame.

A CAN data frame 1000 is shown in FIG. 10. The CAN data frame 1000 consists of an arbitration field 1002, a control field 1006, a payload field 1010, a CRC field 1012, and an acknowledgement (ACK) field 1020.

The arbitration field 1002 contains a CAN identifier field 1004 and a remote transmission request (RTF) indicator (not shown). The CAN protocol requires that all contending messages have a unique identifier. A detailed description of the various fields of the CAN data frame 1000 is beyond the scope of this disclosure. An examination of the CAN identifier field 1004 may give insight as to whether the CAN data frame 1000 was sent by an ECU 110 of the asset 100, potentially by another device other than an ECU 110 of the asset 100, or by a diagnostic tool 600. In some embodiment, detecting a particular diagnostic tool entails the telematics device 200 inspecting the payload field 1010 as will be described below.

Figure 11:
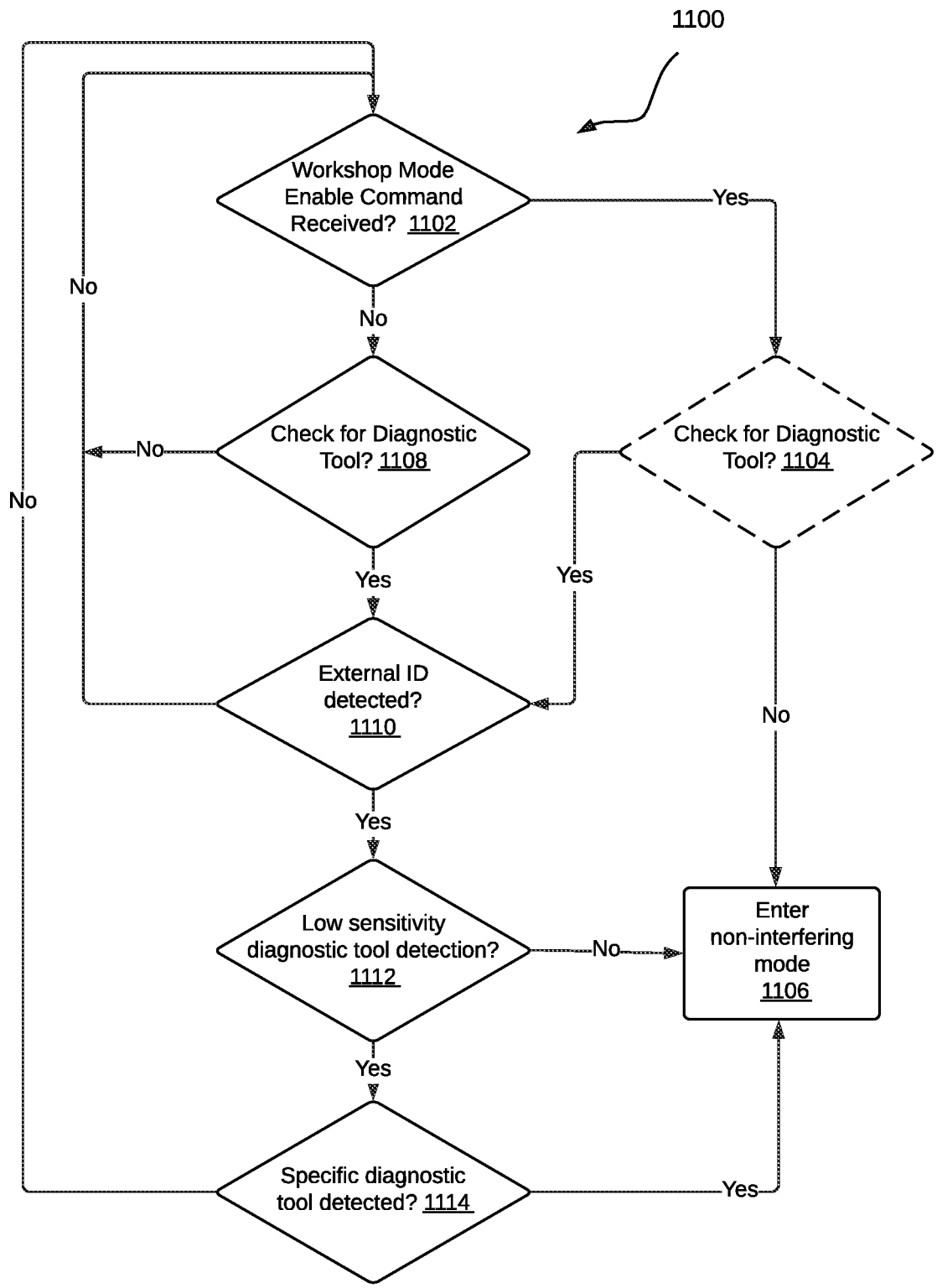
FIG. 11 is a flow chart illustrating method, by a telematics device, for entering a requests-blocked mode, in accordance with embodiments of the present disclosure.

FIG. 11 depicts a method 1100 of configuring a telematics device 200 to operate in a non-interfering mode, in accordance with embodiments of the present disclosure. The method 1100 is performed by a telematics device 200, coupled to an asset 100, and in communication with a telematics server 300. In method 1100, operating in a non-interfering mode may be based on receiving a workshop enable command or on detecting a diagnostic tool connected to the communications bus of the asset to which the telematics device 200 is connected. The factors that the telematics device 200 considers may also have global flags associated therewith that either enables or disables them as will be discussed below.

At step 1102, the telematics device 200 checks whether a workshop mode enablement command similar to the one described with reference to step 908 above has been received. Checking for the reception of a workshop enablement command may involve receiving a message from the telematics server 300. If a workshop mode enablement command has been received, control goes to step 1104. If, at step 1102, no workshop mode enable command was received, the telematics device proceeds to step 1108.

At step 1104, the telematics device 200 checks a diagnostic tool checking flag. If the diagnostic tool checking flag is not set, then the telematics device 200 is not configured to detect the presence of a diagnostic tool 600 connected to the asset 100. If that is the case, the fact that a workshop mode enable command was received at step 1104 is sufficient for the telematics device to enter a non-interfering mode and control goes to step 1106. If the diagnostic tool checking flag is set, then a diagnostic tool detection must be performed before the device may enter the non-interfering mode, and control goes to step 1110. Step 1104 may be optional in some embodiments in which the workshop enable command has a higher precedence than diagnostic tool detection. As such, the decision box for step 1104 is shown in dashed lines.

At step 1106, the telematics device 200 enters a non-interfering mode. As discussed above, the non-interfering mode may be a listen-only mode in which the telematics device 200 only listens for frames on the asset communications bus, such as the CAN bus 150 for a vehicle asset. Alternatively, the non-interfering mode may be a requests-blocked mode in which the telematics device may listen for frames on the asset communications bus and may also acknowledge such frames.

In some embodiments, when the telematics device 200 enters the non-interfering mode the telematics device 200 may save an indication that it is in the non-interfering mode in persistent storage, such as flash memory so that this mode is retained even if the telematics device 200 is reset.

At step 1108, the telematics device 200 checks a diagnostic tool checking flag. If the diagnostic tool checking flag is not set, then the telematics device 200 is not configured to detect the presence of a diagnostic tool 600 connected to the asset 100. Since a workshop mode enable command was not received at step 1104 and the telematics device is not configured to detect the presence of a diagnostic tool 600, then control goes back to step 1102.

At step 1110, the telematics device 200 checks whether a CAN frame tagged with an external identifier is detected on the asset communications bus, such as on the CAN bus 150. The external identifier refers to an identifier in the CAN identifier field 1004 which is not expected to be seen on the CAN bus 150 when no other devices other than the ECUs 110 are connected. If the telematics device 200 does not detect an external identifier on the asset communications bus, then control goes back to step 1102. If an external identifier is detected on the asset communications bus, then control goes to step 1112.

At step 1112, the telematics device 200 evaluates a diagnostic tool detection sensitivity setting. The diagnostic tool detection sensitivity setting determines whether the telematics device 200 enters the non-interfering mode upon detecting any external identifier or only upon detecting a specific diagnostic tool. The diagnostic tool detection sensitivity setting may be set to a particular value by the telematics server 300. In some embodiments, the fleet manager 20 may use the administration terminal 400 to configure the diagnostic tool detection sensitivity setting for a telematics device 200. The telematics server 300 may then push the diagnostic tool detection sensitivity setting to the telematics device 200.

A low sensitivity setting configures the telematics device 200 to enter the non-interfering mode only if a specific diagnostic tool is determined to be present on the asset communication bus, such as the CAN bus 150. In one embodiment, the telematics device 200 determines that a specific diagnostic tool is present on the CAN bus 150, when a CAN data frame 1000 containing one of a plurality of specific external identifiers known to belong to one or more diagnostic tools is detected on the CAN bus 150. The one of a plurality of specific external identifiers being detected in an identifier field, such as CAN identifier field 1004 of the CAN data frame 1000 are considered diagnostic tool identifiers. In another embodiment, the telematics device 200 determines that a specific diagnostic tool is present on the CAN bus 150 when the payload field 1010 of a CAN data frame 1000 detected on the CAN bus 150 contains a particular pattern known to be sent by a specific diagnostic tool or a plurality of diagnostic tools. In yet another embodiment, the telematics device 200 determines that a specific diagnostic tool is present on the CAN bus 150 when both the identifier field such as the CAN identifier field 1004 of the CAN data frame 1000 corresponds to a specific diagnostic tool and the payload field 1010 of the CAN data frame 1000 contains a pattern indicative of at least one diagnostic tool.

A high sensitivity setting configures the telematics device 200 to enter the non-interfering mode if any external identifier is detected on the asset communications bus, such as the CAN bus 150. Specifically, the CAN identifier field 1004 of all CAN data frames 1000 received by the telematics device 200 from the CAN bus 150 are checked. If the telematics device 200 detects an identifier in the CAN identifier field 1004 that is not expected from the ECUs 110 of the asset 100 to which the telematics device 200 is coupled, then the telematics device 200 treats this detection as a trigger to enter the non-interfering mode, when the telematics device 200 is configured with high-sensitivity diagnostic tool detection.

At step 1112, if the sensitivity is high, i.e., the sensitivity mode is not low, then control goes to step 1106 in which the telematics device 200 enters the non-interfering mode since an external identifier has been detected in step 1110. If, at step 1112, the diagnostic tool detection sensitivity mode is set to low sensitivity, then control goes to step 1114.

At step 1114, telematics device 200 determines whether a specific diagnostic tool is present on the communications bus, such as the CAN bus 150 of the asset 100 to which the telematics device 200 is connected. In some embodiments, the external identifier which was detected on the asset communications bus is checked to determine whether it corresponds to a known diagnostic tool. For example, the telematics device 200 may compare the external identifier (i.e., the CAN identifier field 1004 of a CAN data frame 1000) with a plurality of known identifiers corresponding to a plurality of commonly used diagnostic tools. Alternatively, or additionally, the telematics device may inspect the payload field 1010 of the CAN data frame 1000 to check for particular patterns that are indicative of one or more known diagnostic tools. If there is a match with a known external identifier known to belong to one or more known diagnostic tools or a pattern in the payload field 1010 that is indicative of one or more diagnostic tools is detected, the telematics device 200 determines that a known diagnostic tool is present on the asset communications bus, such as the CAN bus 150 and control goes to step 1106 where the telematics device 200 enters the non-interfering mode. If there is no match between the external identifier which was detected on the asset communications bus and the plurality of known identifiers corresponding to the plurality of commonly used diagnostic tools, and no pattern in the payload field 1010 is indicative of a commonly used diagnostic tool, then the telematics device determines that no known diagnostic tool is present on the CAN bus 150. In the latter case, control goes back to step 1102. As discussed above, determining the presence of a diagnostic tool 600 may be based on contents of the CAN identifier field 1004 of a broadcast frame, on contents of the payload field 1010 of the broadcast frame, or on both.

The method 1100 described above may be repeated periodically, by the telematics device 200, to ensure the proper detection of either being in a workshop or having a diagnostic tool 600 connected to the asset, and to ensure that the non-interfering mode is adequately entered. Advantageously, interfering with the operation of the diagnostic tools is averted as discussed above.

Figure 12:
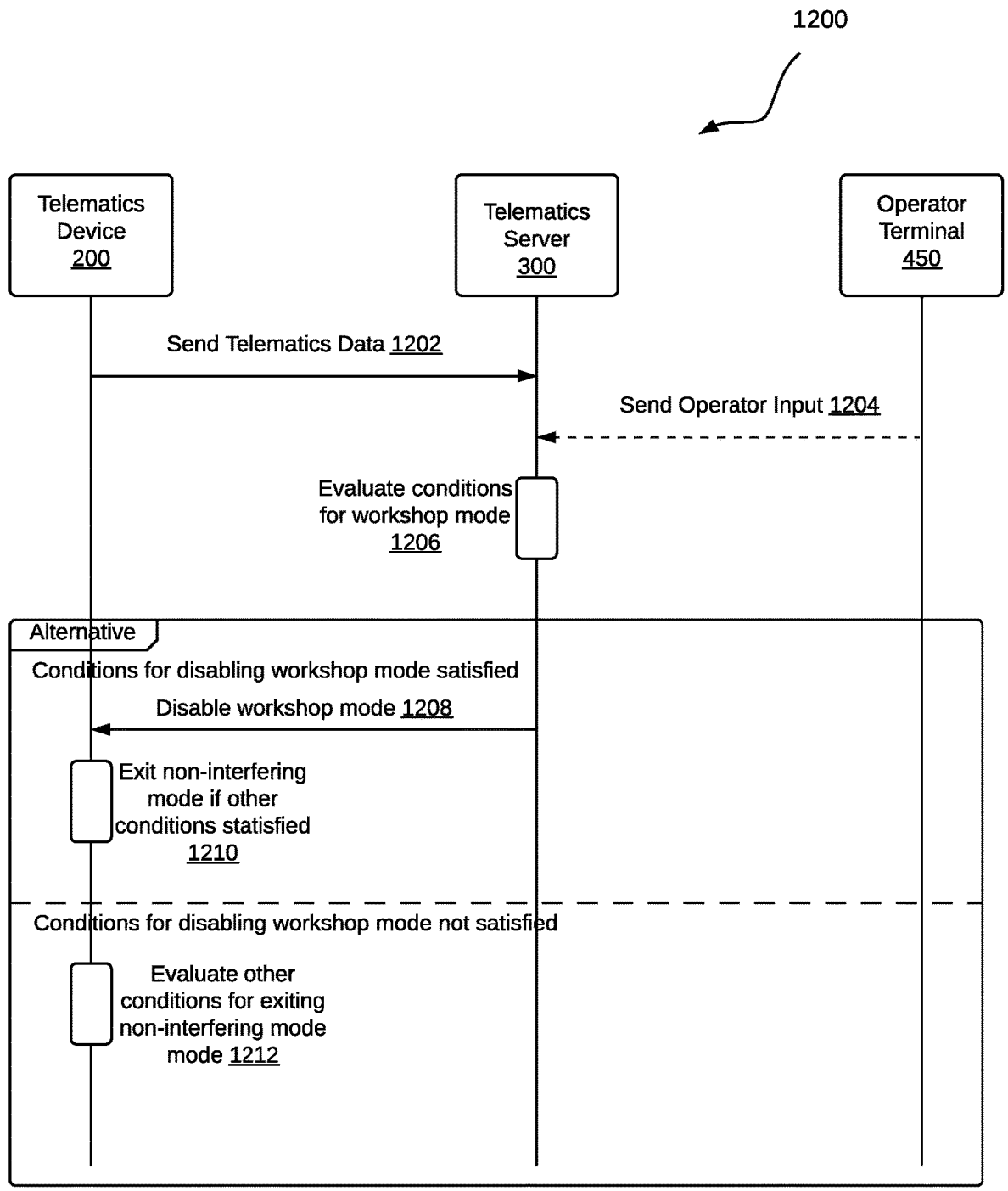
FIG. 12 is a message sequence diagram illustrating disabling workshop mode on a telematics device, in accordance with embodiments of the present disclosure.

Configuring the telematics device 200 is in the non-interfering mode has the advantage of avoiding interfering with the operation of a diagnostic tool 600. However, configuring the telematics device 200 in the non-interfering mode limits the asset data 112 gathered by the telematics device 200 from the asset 100. This is because some asset data 112 are only sent by the ECUs 110 in response to requests for such data. In a non-interfering mode, the telematics device 200 is either in a listen-only mode or in a requests-blocked mode, both of which do not allow the telematics device 200 to make explicit requests for some asset data 112 provided by the ECUs 110. Accordingly, the telematics device 200 needs to exit the non-interfering mode whenever it is not necessary to be in that mode in order not to miss capturing asset data 112 unnecessarily as some of the asset data 112 may contain important information about the operation of the asset 100. Both the telematics server 300 and the telematics device 200 may periodically evaluate the conditions that led to the telematics device 200 to operate in the non-interfering mode. For example, the telematics server 300 may periodically evaluate whether the telematics device 200 is still geographically located in a workshop or if it has received an indication from an operator terminal 450 indicating that the telematics device 200 is no longer in a workshop. The telematics device 200 may periodically check the CAN data frames 1000 on the CAN bus to determine whether the conditions that led to the telematics device 200 entering the non-interfering mode are no longer satisfied. FIG. 12 depicts a message sequence diagram illustrating a method 1200 for disabling the non-interfering mode based on conditions evaluated both at the telematics server 300 and at the telematics device 200, in accordance with embodiments of the present disclosure At step 1202, the telematics device 200 sends telematics data 212 as described above with reference to step 902. The telematics server 300 receives the telematics data 212. The telematics data 212 may contain location data 207 for the telematics device 200.

At step 1204, the operator terminal 450 may send operator input to the telematics server 300. The operator input sent at step 1204 may comprise an indication that maintenance performed on an asset 100 coupled to the telematics device 200 has been concluded, or that the asset 100 is no longer in a service center, such as a workshop. The operator input sent at step 1204 is received by the telematics server 300. In another embodiment (not shown), the fleet manager 20 provides input on an administration terminal 400 indicating that a particular asset 100 is no longer undergoing maintenance. The input is sent from the administration terminal 400 to the telematics server 300 in a manner similar to what is described herein with reference to step 1204.

At step 1206, the telematics server 300 evaluates the conditions that determine whether the telematics device 200 should exit out of workshop mode. The telematics server 300 evaluates the telematics data 212 including the location of the telematics device 200 which is also the location of the asset 100 to which the telematics device is coupled. For example, as discussed above with reference to step 906 of FIG. 9, the telematics server 300 may determine whether the asset 100 is located inside a zone corresponding to a service center. If the location data 207 included in the telematics data 212 received by the telematics server 300 indicates that the asset 100 is no longer located at a service center, the telematics server 300 may determine that the telematics device 200 needs to exit from workshop mode. In some embodiments, the telematics server 300 determines that the asset 100 needs to exit from workshop mode in response to receiving the operator input in step 1204. For example, the telematics server 300 may determine that the telematics device 200 needs to exit from workshop mode in response to receiving an operator input indicating that the vehicle is no longer undergoing any diagnostics or maintenance. In other embodiments, the telematics server 300 may determine that the telematics device 200 needs to exit workshop mode based on both the operator input and the telematics data 212. If the telematics server 300 determines that the telematics device 200 needs to exit from workshop mode, i.e., that the conditions for disabling workshop mode are satisfied then control goes to step 1208. If the telematics server 300 determines that the conditions for disabling workshop mode are not satisfied, then control goes to step 1212.

At step 1208, the telematics server 300 sends a workshop mode disable command to the telematics device 200. The telematics device 200 receives the workshop mode disable command.

At step 1210, the telematics device 200 may exit the non-interfering mode in response to receiving the command to disable workshop mode from the telematics server 300 after evaluating other conditions for the non-interfering mode. This is explained in further detail below.

In the absence of receiving a command to disable workshop mode, as in step 1210, at step 1212 the telematics device 200 may evaluate other conditions which determine whether or not the telematics device 200 should exit the non-interfering mode. This is explained further below with reference to FIG. 13.

The method described in FIG. 12 may be modified, in accordance with some embodiments. In some embodiments, the operator terminal 450 may communicate directly with the telematics device 200 and control whether it exits workshop mode. For example, the operator 10 may know immediately when the asset 100 is no longer undergoing diagnostics although it is still geographically located in a service center. Accordingly, the operator 10 may cause the operator terminal 450 to send a message to the telematics device 200 causing it to exit workshop mode irrespective of its location. In some embodiments, the operator terminal 450 may be connected with the telematics device 200 over a short-range communications link, such as Bluetooth.

In other embodiments, the method of FIG. 12 may employ an administration terminal 400 or a handheld administration terminal 410 in place of the operator terminal 450. In such embodiments, the fleet manager 20 may use the administration terminal 400 or handheld administration terminal to provide input to the telematics server 300 that may result in the telematics server 300 sending a command to disable workshop mode to a telematics device 200. In some embodiments, the administration terminal 400 or handheld administration terminal 410 respond to a request to exit workshop mode and the response to the telematics server 300 authorizing exiting the workshop mode causes the telematics server 300 to send a command to disable workshop mode at a telematics device 200, as described above in step 1208.

Figure 13:
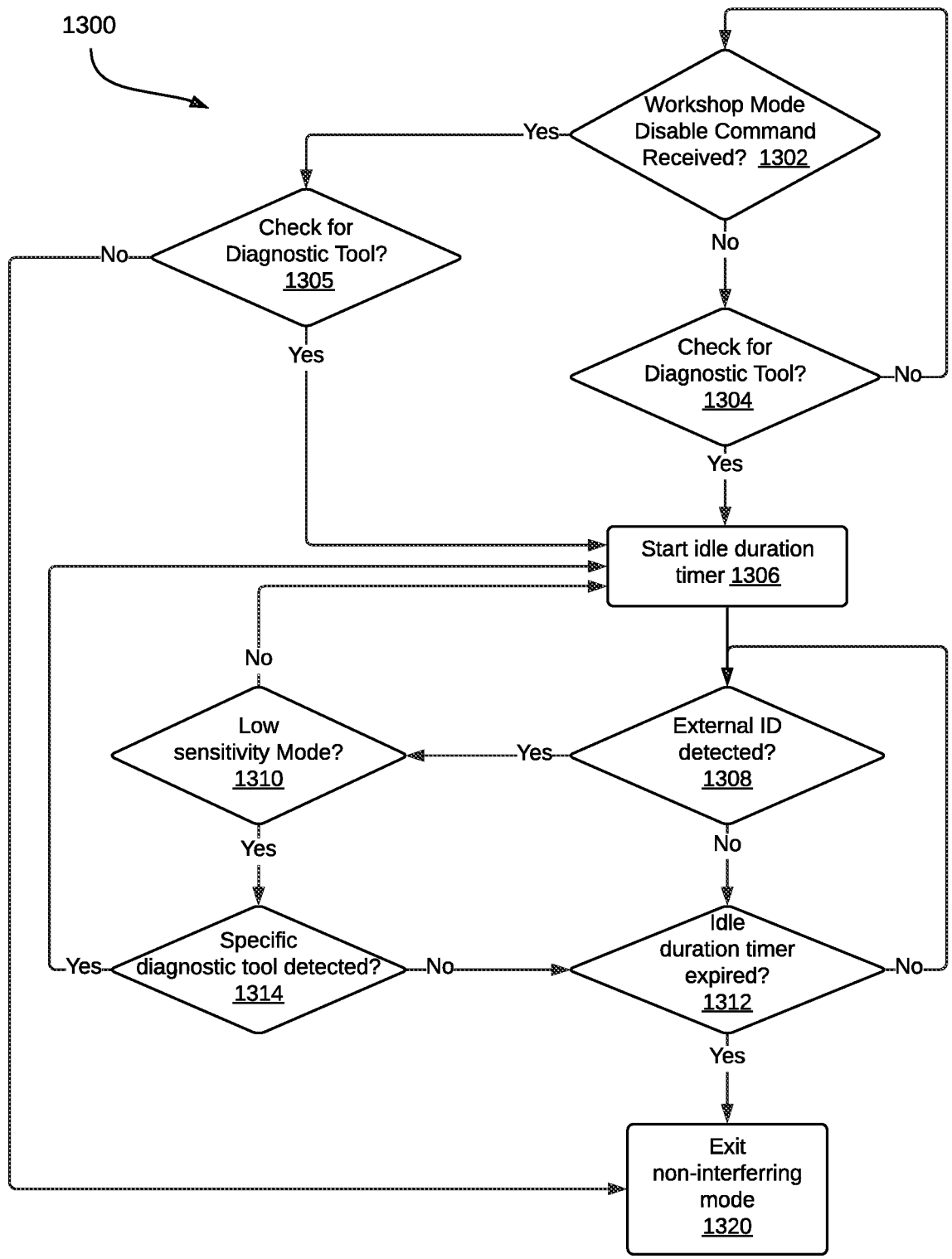
FIG. 13 is a flow chart illustrating a method, by a telematics device, for disabling a requests-blocked mode, in accordance with embodiments of the present disclosure.

FIG. 13 is a flow chart depicting a method 1300 for disabling a requests-blocked mode in a telematics device 200, in accordance with embodiments of the present disclosure.

At step 1302, the telematics device 200 checks whether a command to disable workshop mode has been received, for example from the telematics server 300. If a command to disable workshop mode has been received, control goes to step 1305. If a command to disable workshop mode has not been received, control goes to step 1304.

At step 1305, the telematics device 200 checks whether it is configured to also check for diagnostic tool connectivity. This step may involve checking a configuration flag. If the telematics device 200 was configured to check for diagnostic tool connectivity, then the telematics device 200 may still wish to check whether a diagnostic tool is connected to the asset communications bus and control goes to step 1306. Conversely, if at step 1305, it is determined that checking for diagnostic tool presence on the asset communications but is not necessary, then control goes to step 1320. The configuration which is checked at step 1305 determines whether a workshop disable command should take precedence over determining whether a diagnostic tool is present on or connected to the asset communications bus, when determining whether to disable the non-interfering mode of the telematics device 200.

At step 1304, the telematics device 200 determines whether it is in a mode which checks for diagnostic tool connectivity. This step is similar to step 1305. If the configuration flag is set, then control goes to step 1306 to proceed with steps that check for diagnostic tool connectivity. If, at step 1304, the telematics device 200 determines that it does not need to check for diagnostic tool connectivity, then control goes back to step 1302.

The configuration flag checked in steps 1304 and 1305 may be considered a master switch for diagnostic tool detection. The master switch may enable or disable scan tool detection. When scan tool detection is disabled, the telematics device 200 enters or exits the non-interfering mode based solely on the workshop mode enable command and workshop disable command, respectively.

Checking whether the telematics device 200 should exit the non-interfering mode based on diagnostic tool connectivity involves exiting the non-interfering mode if no traffic from a diagnostic tool is detected for a particular period of time, which may be referred to as the idle time. Accordingly, the telematics device 200 may set a timer after the last frame or packet is received from a diagnostic tool or after the last frame with an external identifier is detected. If no other packets or frames are received from the diagnostic tool or having an external identifier for the duration of the timer, then upon the expiry of the timer the telematics device 200 exits the non-interfering mode. Packet or frames received from a diagnostic tool are identified by external identifiers or by patterns in their payload as described above.

At step 1306, an idle duration timer is started. The idle duration timer is used to trigger exiting the non-interfering mode when no external identifiers are detected for an idle duration based on the sensitivity setting of the telematics device 200 as described further below. The idle duration may be set to a predetermined period. For example, the idle duration may be set to 10 minutes.

At step 1308, the telematics device 200 checks whether a frame containing an external identifier is detected. If no frames with an external identifier are detected, then control goes to step 1312. Otherwise, if at least one frame with an external identifier is detected, then control goes to step 1310.

At step 1310, the telematics device 200 checks whether the diagnostic tool detection sensitivity is low or high. If the diagnostic tool detection sensitivity is high, that means that the device has entered the non-interfering mode based on the detection of any external identifier. Accordingly, if the condition at step 1310 is false, then the received external identifier should cause the telematics device 200 to remain in the non-interfering mode. Additionally, the idle timer should be restarted. Therefore, if the condition at step 1310 is false, control goes back to step 1306.

If the condition at step 1310 is true, then the telematics device 200 has only entered the non-interfering mode in response to receiving an external identifier that corresponds to a diagnostic tool 600 or detected a pattern corresponding to a diagnostic tool 600 in the payload field 1010 of a CAN data frame 1000. In this case, control goes to step 1314.

At step 1314, the external identifier detected at step 1108 is checked to determine whether it corresponds to a diagnostic tool 600. Alternatively, or additionally, the payload field 1010 of the corresponding frame may be checked for a pattern corresponding to the diagnostic tool 600. If the external identifier detected corresponds to a diagnostic tool 600 or if the payload field 1010 contains a pattern corresponding to the diagnostic tool, then the telematics device 200 needs to remain in the non-interfering mode. Furthermore, the idle duration timer needs to be restarted. Accordingly, control goes to step 1306.

If, at step 1314, it is determined that the received frame does not contain an indication that it corresponds to a diagnostic tool 600, then control goes to step 1312.

At step 1312, the telematics device 200 has determined that it has not received an indication that a diagnostic tool 600 is currently connected to the asset communications bus. However, the telematics device 200 does not exit the non-interfering mode until sufficient time has passed during which it has not received an indication that a diagnostic tool 600 is not connected to the asset communications bus. This accounts for situations where a diagnostic tool 600 may pause sending messages (e.g., packets or frames) on the asset communications bus, such as CAN bus 150 to perform some computations or display some reports. Accordingly, the telematics device 200 remains in the non-interfering mode until the idle duration has expired without receiving any external identifiers that would require the telematics device to exit the requests-blocked mode. At step 1312, the telematics device 200 checks whether the idle duration timer has expired.

If, at step 1312, the idle duration timer has not expired, then control goes back to step 1308 to check for another received frame, such as a CAN data frame 1000 and determine whether the received frame contains an indication that a diagnostic tool 600 is still present on the asset communications bus.

If, at step 1312, the idle duration timer has expired, then this indicates that a sufficient time has passed without the telematics device 200 receiving any indication of a diagnostic tool connected to the asset communications bus. In response, control goes to step 1320 where the telematics device exits the non-interfering mode. When the telematics device 200 exists the non-interfering mode at step 1320, the telematics device 200 may save an indication that it is no longer in the non-interfering mode in persistent storage, such as flash memory so that this mode is retained even if the telematics device 200 is reset.

As discussed above, the telematics device 200 may be deployed in a vehicle asset. Under normal operation, when the vehicle's ignition is enabled, the telematics device 200 draws power from the vehicle's interface port 102, which may be an OBD port. However, when a vehicle's ignition is disabled, the telematics device 200 may enter into one or more power-saving modes in which the telematics device 200 powers down many of the peripherals thereof and wakes up periodically. One of the peripherals which may be powered down is the network interface 220. The telematics device 200 enters the one or more power saving modes to avoid draining the battery of the vehicle to which it is coupled.

A first power-saving mode may involve a relatively short wake-up period. For example, the telematics device 200 may enter a first power-saving mode, such as a sleep mode, and wake up every 30 minutes. When the telematics device wakes up, it powers up the network interface 220 and, among other activities, connects with the telematics server 300. When the telematics device connects with the telematics server 300, any pending commands that the telematics server 300 had attempted to send to the telematics device 200 while the network interface was powered down, are sent to the telematics device 200 when the telematics device 200. This may include a workshop disable command that is intended to take the telematics device 200 out of the non-interfering mode. If the workshop disable command is sent, by the telematics server 300, to the telematics device 200 at the start of a sleep period, it may take up to 30 minutes for the telematics device 200 to wake up, receive the workshop disable command, and exit the non-interfering mode. Under normal operation, the telematics device 200 wakes up and prematurely ends the sleep period if the ignition of the vehicle is turned on. While an ignition may be detected when the telematics device 200 is in normal operation, when the telematics device is in a non-interfering mode, ignition detection may be impaired as it relies on requests which are blocked in the non-interfering mode. For example, if the telematics device 200 cannot request the RPM of an internal combustion engine or an ignition signal for an electric vehicle, then the telematics device 200 will not wake up until the expiry of the sleep duration. As a result, a vehicle may be started and become operational, but the telematics device 200 remains in sleep mode and fails to capture some of the asset data 112.

When a vehicle is parked for an extended period of time, the telematics device 200 may enter a second power-saving mode in which the telematics device wakes up far less frequently than the first power-saving mode. For example, in the second power-saving mode, the telematics device 200 may wake up every 23 hours. When the telematics device 200 is in sleep mode for 23 hours, for example, the problem described above with the failure to capture some of the asset data 112 is even more pronounced. Since the network interface, 220, is powered-off for 23 hours, potentially up to 23 hours of asset data 112 are not captured by the telematics device 200 due to the inability of the telematics device 200 to detect the ignition, exit sleep mode, and receive the workshop disable command from the telematics server 300.

In some instances, the telematics device 200 is configured to remain in sleep mode indefinitely and solely rely on the ignition detection mechanism to take the telematics device 200 out of sleep mode. In cases where the telematics device 200 is in a non-interfering mode and ignition detection is not possible, the telematics device 200 may remain in sleep mode for an indefinite amount of time.

In the aforementioned cases where the telematics device 200 may be in a low-power (or sleep) mode for an extended period of time and is unable to detect an ignition signal from the vehicle, methods of waking up the telematics device 200 other than the ignition signal are contemplated.

In some embodiments, the telematics device 200 is configured to wake-up on motion. For example, the sensors 204 may include at least one motion sensor such as an accelerometer. The telematics device 200 may be configured to wake up from sleep mode when the accelerometer detects movement that is above a particular threshold, such as 0.3g (where g=9.81 m/s$^2$). In this case, if the vehicle to which the telematics device 200 is coupled is driven, the accelerometer detects the movement and causes the telematics device 200 to wake up. Upon wake up, the telematics device is able to receive a command to disable workshop mode from the telematics server 300. In some embodiments, the feature which allows the telematics device 200 to wake up from sleep is disabled by a command from the telematics server 300. For example, a vehicle may be transported on a rough road with many potholes. A fleet manager 20 may use an administration terminal 400 to instruct the telematics server 300 to disable the wake up on movement feature for a telematics device 200 so that the telematics device 200 does not drain the vehicle's battery. If the telematics device 200 is in a non-interfering mode, then the telematics device 200 may ignore the command to disable the wake up on movement feature to prevent a situation of having the telematics device 200 stuck indefinitely in sleep mode.

In some embodiments, when a telematics device 200 remains in sleep mode for an extended duration while in the non-interfering mode, the telematics device 200 may automatically disable the non-interfering mode and return to normal mode of operation. For example, the telematics device 200 may set a timer that expires after 24 hours or 72 hours when the non-interfering mode is enabled. If the timer expires and the non-interfering mode is still enabled, the telematics device 200 may autonomously disable the non-interfering mode.

FIG. 14 is a flowchart for a method 1400 for enabling a non-interfering mode in a telematics device, in accordance with embodiments of the present disclosure. The method 1400 starts at step 1410.

At step 1410, a telematics server 300 determines that a telematics device 200 coupled to an asset communications bus, such as a CAN bus 150, must operate in a non-interfering mode.

At step 1420, the telematics server 300 sends, for example over a network 50, to the telematics device 200 a command to cause the telematics device 200 to operate in the non-interfering mode.

At step 1430, the telematics device 200 enables the non-interfering mode thereon in response to receiving the command from the telematics server 300.

Figure 15:
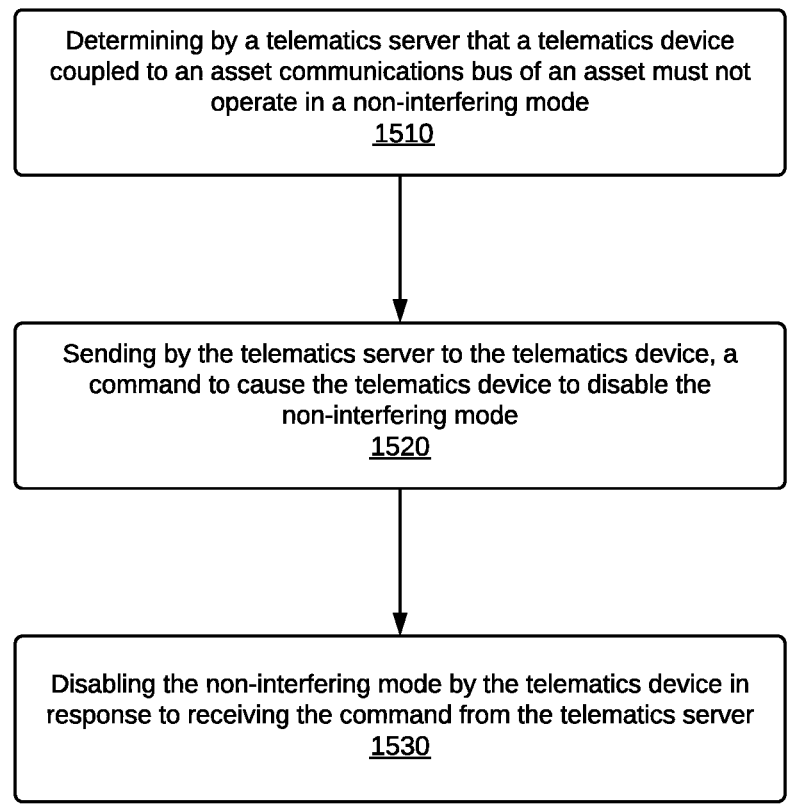
FIG. 15 is a flow chart illustrating a method for disabling a non-interfering mode on a telematics device, in accordance with embodiments of the present disclosure.

FIG. 15 is a flowchart for a method 1500 for disabling a non-interfering ode in a telematics device 200, in accordance with embodiments of the present disclosure. The method starts at step 1510.

At step 1510, the telematics server 300 determines the telematics device 200 coupled to an asset communications bus, such as the CAN bus 150 of the asset 100 must not operate in a non-interfering mode.

At step 1520, the telematics server 300 sends a command to the telematics device 200 to cause the telematics device 200 to disable the non-interfering mode.

At step 1530, telematics device 200 disables the non-interfering mode in response to receiving the command from the telematics server 300.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:
1. A method, comprising:
    operating a telematics device coupled to an asset communications bus of an asset in a first mode in which the telematics device obtains asset data by sending request frames to the asset;

determining, by a telematics server, that the telematics device must operate in a non-interfering mode in which the telematics device does not send request frames to the asset;

sending, by the telematics server, to the telematics device, a command to cause the telematics device to operate in the non-interfering mode; and enabling the non-interfering mode, by the telematics device in response to receiving the command from the telematics server.

2. The method of claim 1, wherein in the non-interfering mode, the telematics device does not interfere with an operation of another device coupled to the asset communications bus.

3. The method of claim 1, wherein determining that the telematics device must operate in the non-interfering mode comprises receiving a user input from an operator terminal, the user input comprising an indication that the telematics device must operate in the non-interfering mode.

4. The method of claim 1, wherein determining that the telematics device must operate in the non-interfering mode comprises determining, at the telematics server, that a location of the telematics device is within a zone defining a service center.

5. The method of claim 1, wherein the non-interfering mode comprises a listen-only mode in which the telematics device only listens for frames broadcast on the asset communications bus.

6. The method of claim 1, wherein the non-interfering mode comprises a requests-blocked mode in which the telematics device listens for frames broadcast on the asset communications bus and acknowledges frames received at the telematics device to a gateway on the asset communications bus.

7. The method of claim 1, further comprising determining, by the telematics device, that the telematics device is to check for a diagnostic tool on the asset communications bus.

8. The method of claim 7, further comprising:
determining that a diagnostic tool detection sensitivity setting is set to a high setting; and
in response to detecting a presence of a device with an external identifier on the asset communications bus, enabling the non-interfering mode by the telematics device.

9. The method of claim 8, wherein detecting the presence of the device with the external identifier comprises detecting an identifier not associated with any control unit of a plurality of electronic control units of the asset in an identifier field of a frame received on the asset communications bus.

10. The method of claim 7, further comprising:
determining that a diagnostic tool detection sensitivity setting is set to a low sensitivity setting; and
enabling the non-interfering mode, by the telematics device in response to detecting a presence of a specific diagnostic tool on the asset communications bus.

11. The method of claim 10, wherein detecting the presence of the specific diagnostic tool on the asset communications bus comprises detecting a diagnostic tool identifier in an identifier field of a frame which is broadcast on the asset communications bus.

12. The method of claim 10, wherein detecting the presence of the specific diagnostic tool on the asset communications bus comprises detecting a pattern associated with the specific diagnostic tool in a payload field of a frame which is broadcast on the asset communications bus.

13. The method of claim 10, wherein detecting the presence of the specific diagnostic tool on the asset communications bus comprises:
detecting a diagnostic tool identifier in an identifier field of a frame which is broadcast on the asset communications bus; and
detecting a pattern associated with the specific diagnostic tool in a payload field of the frame which is broadcast on the asset communications bus.

14. The method of claim 1, further comprising:
determining, by the telematics server, that the telematics device must disable a non-interfering mode;
sending, by the telematics server, to the telematics device, a command to cause the telematics device to disable the non-interfering mode; and
disabling the non-interfering mode, by the telematics device in response to receiving the command from the telematics server.

15. The method of claim 14, wherein determining that the telematics device must disable the non-interfering mode comprises receiving a user input from an operator terminal, the user input comprising an indication that the telematics device must disable the non-interfering mode.

16. The method of claim 14, wherein determining that the telematics device must disable the non-interfering mode comprises determining, at the telematics server, that a location of the telematics device is not in a zone defining a service center.

17. The method of claim 14, further comprising determining, by the telematics device, that the telematics device is to check for a presence of a diagnostic tool on the asset communications bus.

18. The method of claim 17, further comprising:
determining that a diagnostic tool detection sensitivity setting is set to a high setting; and
disabling the non-interfering mode in response to not receiving any frames with an external identifier for a predetermined period of time on the asset communications bus.

19. The method of claim 17, further comprising:
determining that a diagnostic tool detection sensitivity setting is set to a low setting; and
disabling the non-interfering mode in response to not detecting a specific diagnostic tool for a predetermined period of time on the asset communications bus.

20. The method of claim 19, wherein not detecting the specific diagnostic tool comprises receiving a plurality of frames that do not have either:
an identifier associated with the specific diagnostic tool in an identifier field of each of the plurality of frames; or
a pattern associated with the specific diagnostic tool in a payload field of each of the plurality of frames.

* * * * *